US010020773B2

(12) United States Patent
Molina et al.

(10) Patent No.: US 10,020,773 B2
(45) Date of Patent: Jul. 10, 2018

(54) PHOTOVOLTAIC MOUNTING SYSTEM

(71) Applicant: SolarCity Corporation, San Mateo, CA (US)

(72) Inventors: David Molina, Oakland, CA (US); Tyrus Hudson, San Rafael, CA (US)

(73) Assignee: SolarCity Corporation, San Mateo, CA (US)

(*) Notice: Subject to any disclaimer, the term of this patent is extended or adjusted under 35 U.S.C. 154(b) by 0 days.

(21) Appl. No.: 14/985,218

(22) Filed: Dec. 30, 2015

(65) Prior Publication Data

US 2016/0308487 A1  Oct. 20, 2016

Related U.S. Application Data

(60) Provisional application No. 62/149,203, filed on Apr. 17, 2015.

(51) Int. Cl.
E04D 13/18 (2018.01)
H02S 20/23 (2014.01)
(Continued)

(52) U.S. Cl.
CPC ............. *H02S 20/23* (2014.12); *F24J 2/5205* (2013.01); *F24J 2/5258* (2013.01); *F24J 2/5264* (2013.01);
(Continued)

(58) Field of Classification Search
CPC .......... H02S 20/00; H02S 20/23; F24J 2/5245
(Continued)

(56) References Cited

U.S. PATENT DOCUMENTS 4,189,881 A * 2/1980 Hawley ................... E04D 3/366
136/244
5,121,583 A 6/1992 Hirai et al.
(Continued)

FOREIGN PATENT DOCUMENTS

DE 102008009608 A1 10/2009
DE 202011001761 U1 4/2011
(Continued)

OTHER PUBLICATIONS

International Search Report and Written Opinion dated Jun. 21, 2016 in International Application No. PCT/US2016/023996. 16 pages.
(Continued)

*Primary Examiner* — Charles A Fox
*Assistant Examiner* — James Buckle, Jr.
(74) *Attorney, Agent, or Firm* — Kilpatrick Townsend & Stockton LLP

(57) ABSTRACT

Photovoltaic mounting systems and coupling assemblies for mounting photovoltaic modules are provided. The mounting systems may include short extruded base members that are mounted onto the supporting surface at approximate locations on the supporting surface, and coupling assemblies that may slide along the length of the base members during installation and be locked at particular positions on the length of the base members. The coupling assemblies may be coupled to connectors that in turn couple to two photovoltaic modules. In operation, the installer may first determine approximate locations on which to mount the base members and mount all required base members, and then, place the coupling assemblies at desired locations, lock the coupling assemblies at the desired locations, position the photovoltaic modules in the connectors of the coupling assemblies, and move to the next set of coupling assemblies.

17 Claims, 34 Drawing Sheets

(51) Int. Cl.
*F24J 2/52* (2006.01)
*F24J 2/46* (2006.01)

(52) U.S. Cl.
CPC ............. *F24J 2002/4665* (2013.01); *F24J 2002/5288* (2013.01); *Y02B 10/12* (2013.01); *Y02E 10/47* (2013.01)

(58) Field of Classification Search
USPC ......................................... 52/173.3
See application file for complete search history.

(56) References Cited

U.S. PATENT DOCUMENTS

| | | | |
|---|---|---|---|
| 6,988,344 B1* | 1/2006 | Krueger | F16B 5/0635 52/464 |
| 7,044,701 B2* | 5/2006 | Herb | F16B 37/046 411/349 |
| 7,260,919 B1 | 8/2007 | Spransy et al. | |
| 7,621,487 B2* | 11/2009 | Brown | F16L 3/1025 248/65 |
| 8,413,944 B2* | 4/2013 | Harberts | F24J 2/5205 248/500 |
| 8,511,009 B2 | 8/2013 | Kobayashi et al. | |
| 8,661,765 B2 | 3/2014 | Schaefer et al. | |
| 8,857,113 B2* | 10/2014 | Zhang | H01L 31/048 52/167.5 |
| 8,894,424 B2* | 11/2014 | DuPont | F24J 2/4607 439/95 |
| 8,898,967 B2* | 12/2014 | Bartelt-Muszynski | F24J 2/5203 136/251 |
| 8,919,052 B2* | 12/2014 | West | F24J 2/5211 52/173.3 |
| 8,955,266 B2 | 2/2015 | Zhang | |
| 8,991,065 B1 | 3/2015 | Schrock | |
| 9,080,792 B2 | 7/2015 | Patton et al. | |
| 9,097,443 B2 | 8/2015 | Liu et al. | |
| 9,175,478 B2 | 11/2015 | Stearns et al. | |
| 9,331,629 B2* | 5/2016 | Cheung | H02S 20/23 |
| 9,431,953 B2* | 8/2016 | Stearns | H02S 20/23 |
| 9,453,592 B2* | 9/2016 | Zhang | F16B 37/0885 |
| 9,518,596 B2* | 12/2016 | West | F24J 2/5247 |
| 9,531,319 B2* | 12/2016 | Braunstein | H02S 20/23 |
| 2003/0070368 A1* | 4/2003 | Shingleton | F24J 2/5205 52/173.3 |
| 2008/0000173 A1* | 1/2008 | Lenox | F24J 2/5245 52/173.1 |
| 2011/0302857 A1* | 12/2011 | McClellan | E04D 13/0445 52/173.3 |
| 2013/0048815 A1 | 2/2013 | Wagner et al. | |
| 2013/0320166 A1 | 12/2013 | Kemple et al. | |
| 2014/0003861 A1 | 1/2014 | Cheung et al. | |
| 2014/0026946 A1 | 1/2014 | West et al. | |
| 2014/0175244 A1 | 6/2014 | West et al. | |
| 2014/0311087 A1 | 10/2014 | Haddock | |
| 2014/0366464 A1 | 12/2014 | Rodrigues et al. | |
| 2015/0129517 A1 | 5/2015 | Wildes | |

FOREIGN PATENT DOCUMENTS

| | | |
|---|---|---|
| EP | 2146160 A1 | 1/2010 |
| EP | 2194341 A2 | 6/2010 |
| EP | 2604949 A1 | 6/2013 |
| EP | 2607568 A1 | 6/2013 |
| EP | 2756238 A1 | 7/2014 |
| JP | H05280168 A | 10/1993 |
| JP | 2013147804 A | 8/2013 |
| JP | 2015151776 A | 8/2015 |
| KR | 20110007692 A | 1/2011 |
| WO | 2013037384 A1 | 3/2013 |
| WO | 2013092428 A1 | 6/2013 |
| WO | 2014169396 A1 | 10/2014 |

OTHER PUBLICATIONS

Senersun Limited, "Senersun Introduces its Mounting Systems," archived Jan. 22, 2015 from http://web.archive.org/web/20150122134037/http://www.senersun.com/wp-content/uploads/2013/07/Mounting-system-catalogue_computer.pdf, 39 pages.

Ecolibrium Solar, "EcoX Installation Guide," Jul. 2015, retrieved Mar. 27, 2016 from http://www.solarworld-usa.com/~/media/www/files/datasheets/mounting-solutions/ecolibrium/ecox%20installation%20guide%20v2%20r1%200.pdf?la=en, 33 pages.

English translation of Office Action dated Apr. 18, 2017 in JP Patent Application No. 2016-067424. 10 pages.

International Preliminary Report on Patentability dated Oct. 26, 2017 for International Application No. PCT/US2016/023996, filed Mar. 24, 2016. 12 pages.

* cited by examiner

PHOTOVOLTAIC MOUNTING SYSTEM

CROSS-REFERENCES TO RELATED APPLICATIONS

This claims the benefit of U.S. Provisional Application No. 62/149,203, filed Apr. 17, 2015, the disclosure of which is incorporated herein by reference in its entirety for all purposes.

FIELD OF THE INVENTION

Embodiments of the present disclosure pertain to mounting systems for photovoltaic arrays.

BACKGROUND

Assembling photovoltaic arrays is typically a time consuming process. Improvements are therefore always desired to make array assembly faster, easier, and less expensive. By reducing the time taken to assemble the array, the overall system cost is reduced. Assembly and mounting of photovoltaic arrays typically requires precisely located mounting components used to affix the arrays to supporting structures such as the roof or roof rafters. In many installations, this may require significant time spent planning once at the installation site to determine particular locations for a variety of mounting components. When exact locations aren't correctly determined, adjustments often require additional components and/or reinstallation altogether as well as roof repairs. Accordingly, systems with flexibility in installation and reduced components are desirable.

BRIEF SUMMARY

The present invention provides photovoltaic mounting systems and coupling assemblies for mounting photovoltaic modules. These mounting systems may include short extruded base members that are mounted onto the supporting surface at approximate locations on the supporting surface, and coupling assemblies that may slide along the length of the base members during installation and be locked at particular positions on the length of the base members. The coupling assemblies may be coupled to connectors that in turn couple to two photovoltaic modules. In operation, the installer may first determine approximate locations on which to mount the base members and mount all required base members, then place the coupling assemblies at desired locations, lock the coupling assemblies at these locations, position the photovoltaic modules in the connectors of the coupling assemblies, and move to the next set of coupling assemblies.

Since the coupling assemblies are slidable along the length of the base members, the placement of the base members does not need to be pre-determined. In other words, the slidability of the coupling assemblies during installation allows for some flexibility in at least one direction and may reduce the time spent prior to assembly planning the exact location of the mounting of base members. Furthermore, the flexibility in placement of the coupling assemblies may also help avoid the need of additional components that might otherwise be needed, for example, as a result of conflicts between mounting components.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosure. Thus, the invention is not limited to the embodiments described and shown.

Figure 1:
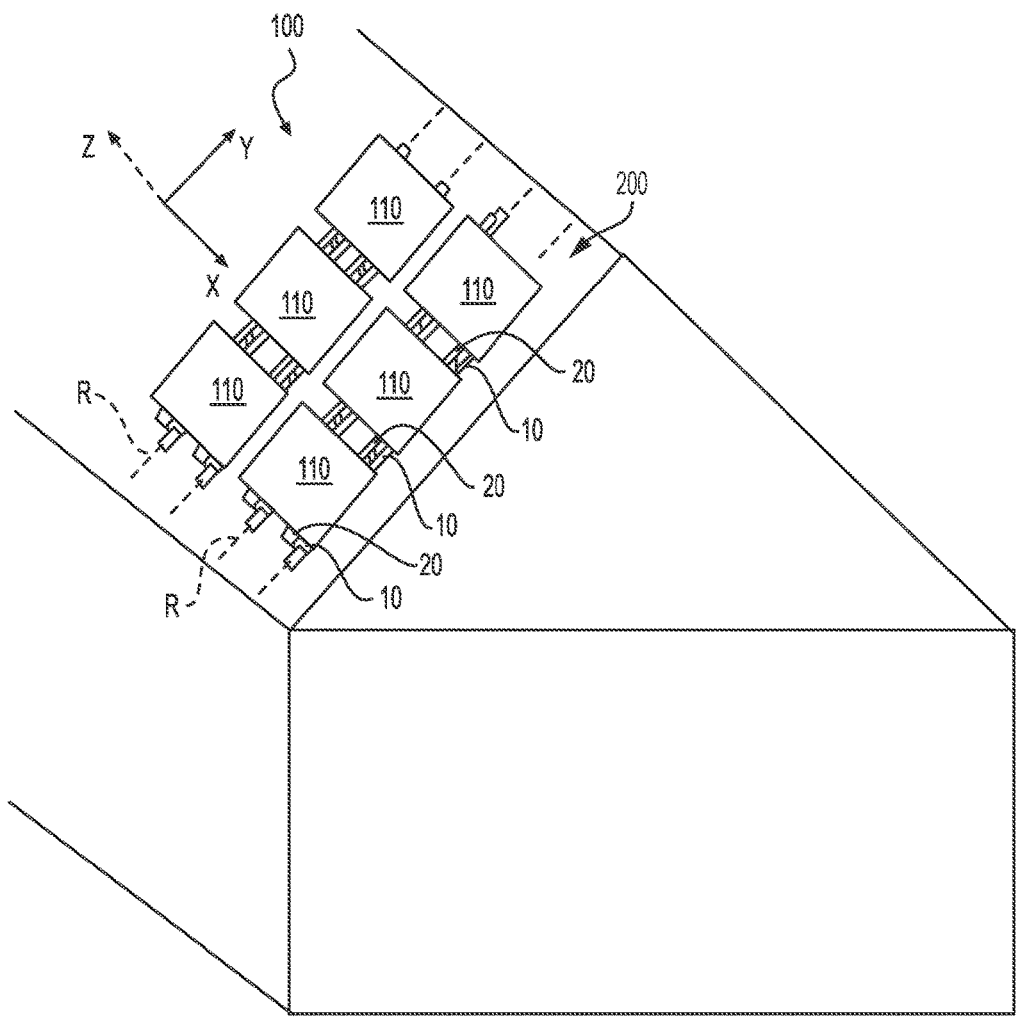
FIG. 1 shows a perspective view of a mounting system for a photovoltaic module array on a building roof, in accordance with an embodiment.
Figure 2:
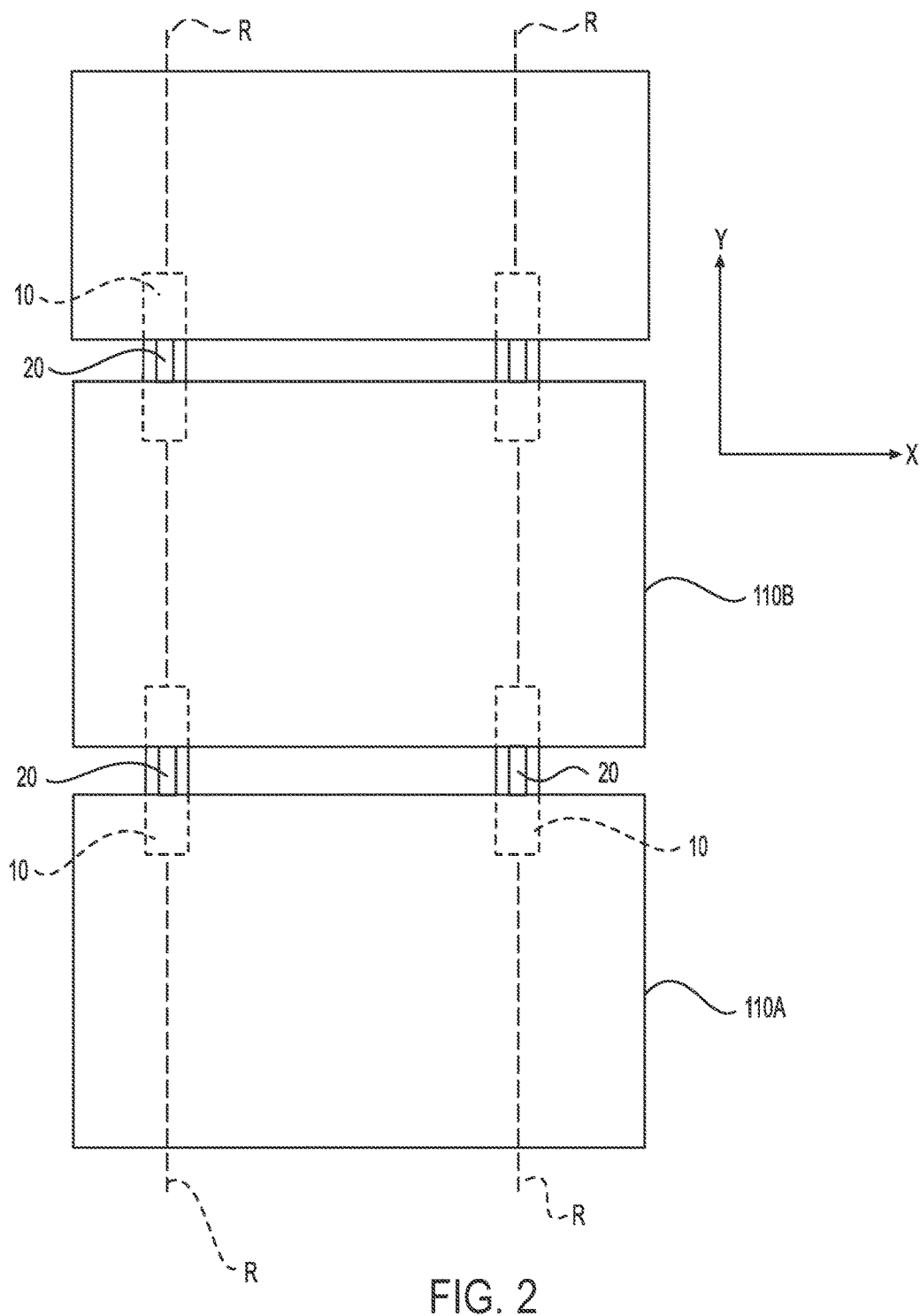
FIG. 2 shows a top plan view of the mounting system shown in FIG. 1.

FIGS. 1 and 2 show a mounting system used to assemble a photovoltaic module array on a building roof, in accordance with an embodiment. Specifically, photovoltaic array 100 may be formed from individual photovoltaic modules 110. In accordance with some embodiments, the mounting system may include extruded base members 10 and coupling assemblies 20. Extruded base members 10 may be mounted onto roof 200. In some embodiments, extruded base members 10 may be mounted onto roof 200 by connecting each extruded base member 10 into one of building rafters R with one or more lag bolts or other fasteners. It should be appreciated that base member 10 could also be formed from rolled-formed or pressed steel or some other manufacturing process besides extrusion.

Each extruded base member 10 may have a coupling assembly 20 mounted thereon. Mounting of coupling assembly 20 onto extruded base members 10 will be described below in accordance with several embodiments. Modules 110 may be mounted onto coupling assembly 20. In some embodiments, modules 110 may be mounted to coupling assembly 20 via a connector mounted onto coupling assembly 20. For example, a connector similar to the rock-it connector labeled 110 and described in U.S. Published Patent Application 2014/0175244 entitled "Connecting Components For Photovoltaic Arrays," may be included in coupling assembly 20. For example, such connectors may have features that fit into grooves in module frames. However, in alternate embodiments, he connectors may simply fit around the top and bottom edges of the modules, as in the case of a wrap-around or clamping connector. Such connector will work with grooved or grooveless PV modules.

Installation of photovoltaic array 100 using the mounting system will generally be described with reference to FIGS. 1 and 2, in accordance with some embodiments. In some embodiments, the approximate locations to install extruded base members 10 may be determined first and extruded base members 10 may then be secured at these locations. Since extruded base members 10 may be secured to rafters R, some flexibility is provided as to where extruded base members may be secured in both the X and Y directions. As shown in FIG. 2, extruded base members 10 may have a length greater than coupling assemblies 20 (but less than each of the sides of modules 110), and as will be described below, coupling assemblies 20 may be slidably positioned along the length of extruded base members 10. Accordingly, coupling assemblies 20 may be positioned at any point along extruded base members 10 in the Y-direction. Thus, it will be understood that the exact location in the Y-direction of extruded base members 10 may not need to be precisely determined, since additional flexibility will be allowed by the slidability of coupling assemblies 20 along the Y-direction. In other words, all of extruded base members 10 in photovoltaic array 100 may be secured to rafters R at approximate locations based on the desired placement of modules 110, since the slidability of coupling assemblies 20 on extruded base members provides some "play" to adjust for tolerances between modules in the Y-direction as the modules are assembled into the array.

Once extruded base members 10 are secured to roof 200, the first row of coupling assemblies 20 may be mounted to the first row of base members 10 at the desired location in the Y-direction. Based on the length of modules 110, the second row of coupling assemblies 20 may then be placed at approximate locations on the second row of base members 10. Next, the first row of modules 110 may be coupled to the first set of coupling assemblies 20 and the second set of coupling assemblies 20. As this occurs, the second set of coupling assemblies 20 may be slidably adjusted to the desired location to account for any tolerances between modules 110 so that they may be appropriately mounted to the first row of modules 110. Once in the desired location, the second set of coupling assemblies 20 may be locked to base members 10. Once the first row of modules 110 is in place, the next row of modules 110 may be placed in the same way as described above.

It will be understood that the installation described above using extruded base members 10 and coupling assemblies 20 that slide thereon allows for mounting flexibility in both the X and Y directions. It will be understood that this flexibility may reduce the time spent during installation. This flexibility may also avoid the need for additional components typically used when conflicts between mounting components occur. For example, rather than using additional components, the location of coupling assemblies 20 may be adjusted along the length of extruded base members 10 so that conflicts can be easily avoided. In addition to the above mentioned flexibility, in some embodiments, connectors that connect coupling assemblies 20 to modules 110 may be rotatable about the Z-axis, permitting further flexibility in mounting. It will be further understood that installation using extruded base members 10 and coupling assemblies 20 as described above involves very few components and may reduce the time and cost of installation.

Figure 3:
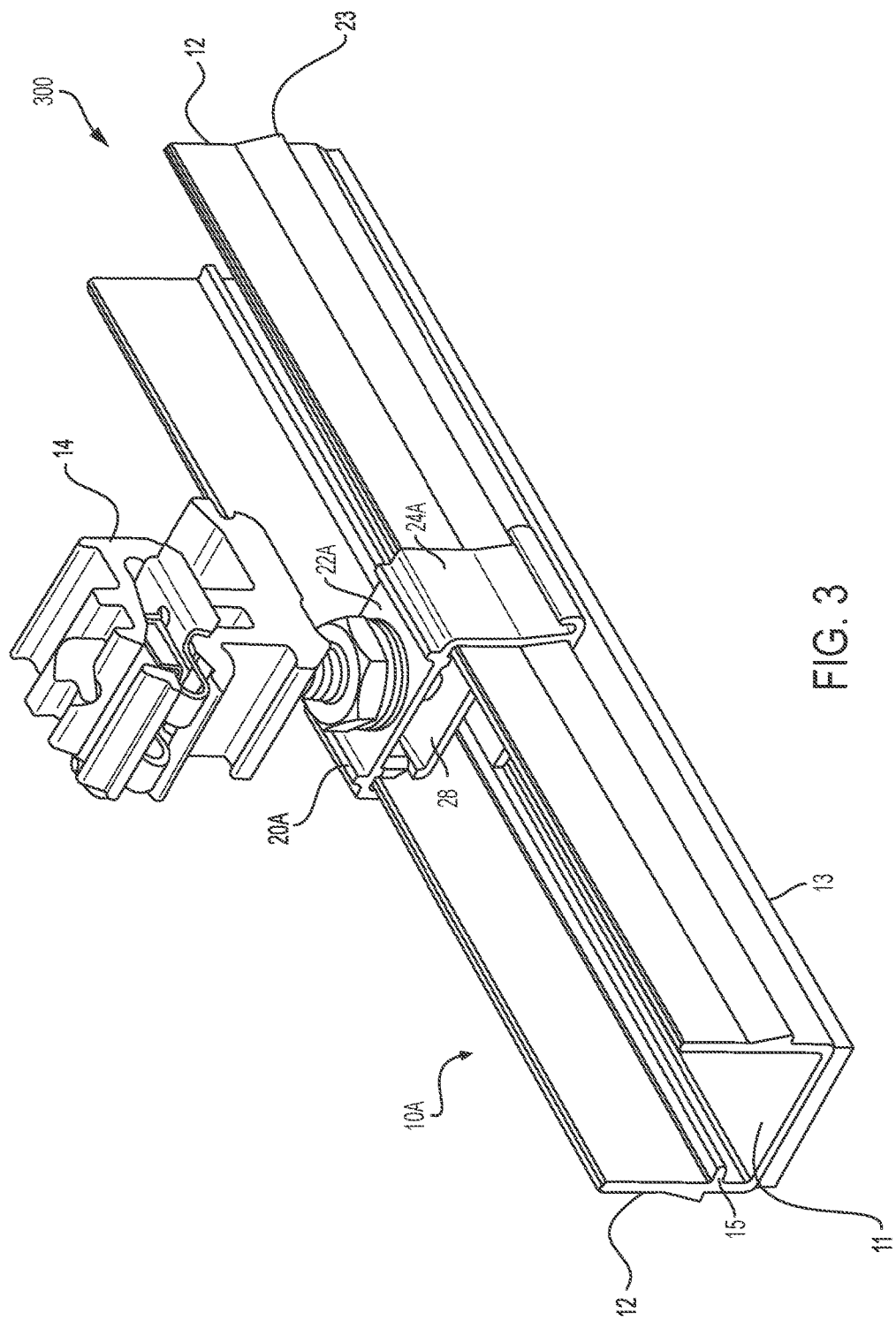
FIG. 3 shows a perspective view of a mounting system, in accordance with an embodiment.
Figure 4:
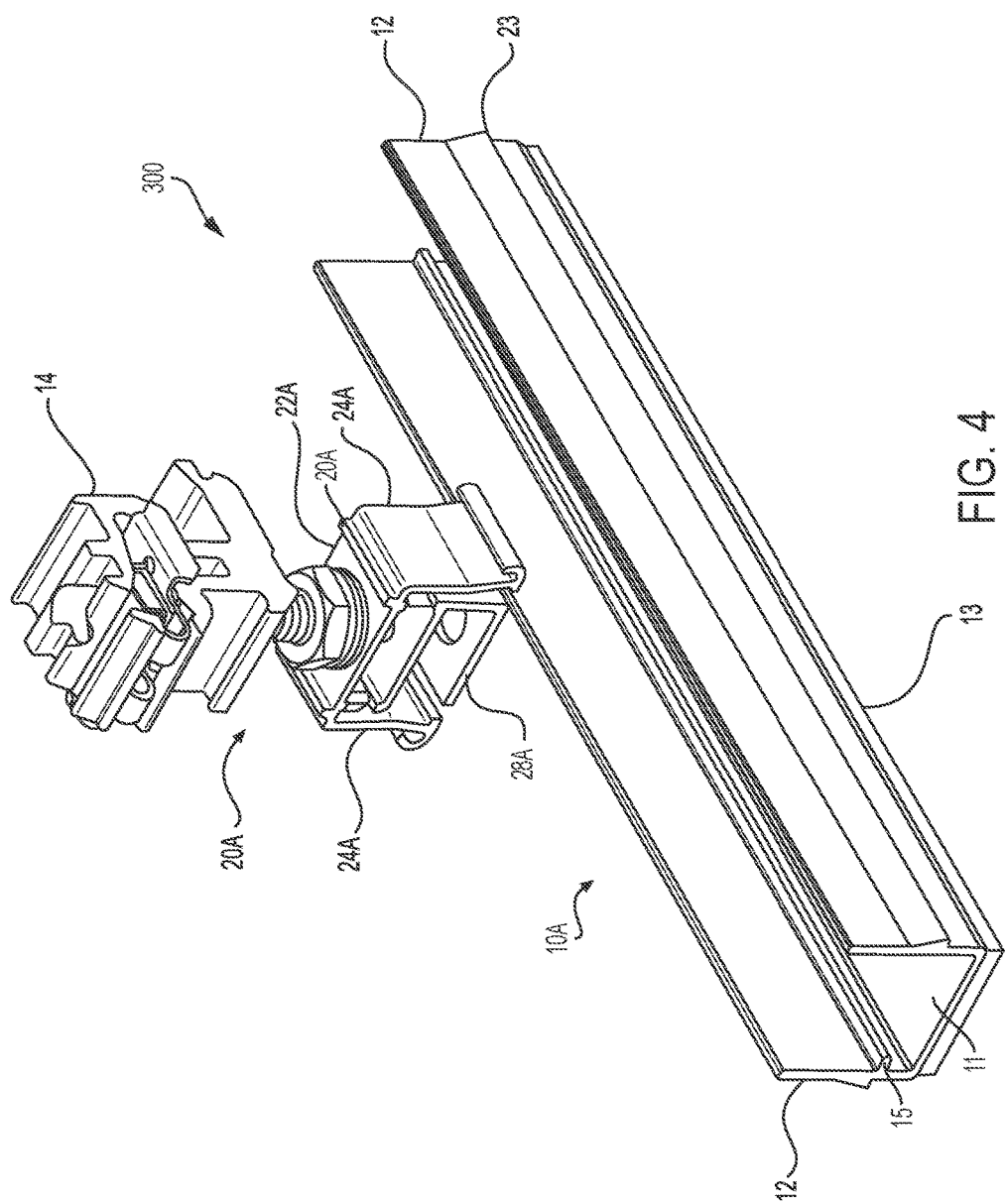
FIG. 4 shows an exploded perspective view of the mounting system shown in FIG. 3.

Various embodiments of extruded base members 10, coupling assemblies 20, and components thereof will now be described with reference to FIGS. 3-34. Referring first to FIGS. 3-8, mounting system 300 is shown, in accordance with an embodiment. Mounting system 300 may include extruded base member 10A, coupling assembly 20A, and connector 14. Extruded base member 10A may include an extruded rail section having center base 11, and a pair of upwardly extending elongated walls 12. Extruded base member 10A may also include inner ridge 15 and outer ridges 23 which interfaces with coupling assembly 20A, as will be described below. For example, inner ridge 15 may extend inward from an inner surface of one of elongated walls 12, and outer ridges 23 may extend from outer surfaces of both of elongated walls 12, as shown in FIGS. 3 and 4.

Optionally, extruded base member 10A may be mounted onto pad 13. Pad 13 may be made of an adhesive sealing material that seals the connection of extruded base member 10A to the supporting structure such as a roof tile when compressed. In some embodiments, pad 13 may be made of butyl rubber or a similar synthetic rubber. As described above with respect to FIGS. 1-2, extruded base member 10A may be secured onto the roof of a building using any suitable couplings. For example, extruded base member 10A may be secured to roof rafters using a pair of lag screws. It will be understood that any suitable couplings may be used to secure extruded base member 10A to the roof or roof rafters, and that any suitable sealing washers or other sealing components may be used to further seal the connection thereto.

As described above with respect to coupling assemblies 20 and extruded base members 10 of FIGS. 1-2, coupling assembly 20A may slide along the length of base member 10A, and once the desired position is identified, may be locked into position, as will be described below. Referring to FIG. 6, coupling assembly 20A may include main body 22A having a pair of arms 24A extending outwardly therefrom. Arms 24A may be dimensioned to be wrapped around outer surfaces of elongated walls 12 of extruded base member 10A. Arms 24A may include projections 37A that project inwards so as to allow arms 24A to latch around outer ridges 23. Coupling assembly 20A may also include tabs 26A that may extend outward from main body 22A. Tabs 26A may be dimensioned to be received against inner surfaces of elongated walls 12 of extruded base member 10A. Coupling assembly 20A may also include lower arm 28A. Lower arm 28A may be dimensioned to be received between elongated walls 12 and may engage with inner ridge 15 as will be described below. Coupling assembly 20A may also include holes 30A disposed in main body 22A and lower arm 28A, which may allow connector 14 to be mounted to coupling assembly 20A. For example, as best shown in FIG. 5, connector 14 may be mounted to coupling assembly 20A using stud 32, sealing washer 34, and nut 33.

FIG. 7A shows an end view of mounting system 300 in a pre-installation position, in accordance with an embodiment. As shown in FIG. 7A, elongated walls 12 of extruded base member 10A may be received between arms 24A. In this position, coupling assembly 20A may be free to slide along the length of extruded base member 10A, in order to allow an installer to identify the desired location of coupling assembly 20A based on the row of modules to be connected thereto. Once the desired location is determined, coupling assembly 20A may be locked into an installed position by pressing downward on coupling assembly 20A. FIG. 7B shows an end view of mounting system 300 in an installed position, in accordance with an embodiment. As shown in FIG. 7B, arms 24A may latch around outer ridges 23 of the extruded base member 10A in the installed position. Additionally, tabs 26A may engage with inner surfaces of elongated walls 12 of extruded base member 10A and deflect inwards when in the installed position. It will be understood that this may provide grounding between components and prevent sliding of coupling assembly 20A once installed. Accordingly, arms 24A (including projections 37A), ridges 23, and tabs 26A may lock coupling assembly 20A to extruded base member 10A in a snap-fit connection. Additionally, as can be seen in FIG. 7B, lower arm 28A may take up tolerances between extruded base member 10A and coupling assembly 20A by engaging with inner ridge 15. For example, as shown in FIG. 7B, lower arm 28A may deflect upwards upon engaging with inner ridge 15 and may provide a spring-like buffer between coupling assembly 20A and extruded base member 10A.

In some embodiments, coupling assembly 20A may be detached from extruded base member 10A. For example, in order to detach coupling assembly 20A from extruded base member 10A, lateral tabs 29A may be provided that extend outward from arms 24A. In some embodiments, coupling assembly 20A may be detached from elongated walls 12 of extruded base member 10A by inserting the end of a screwdriver (or other tool sized to fit therein) into tabs 29A and prying tabs 29A off of outer ridges 23.

Figure 5:
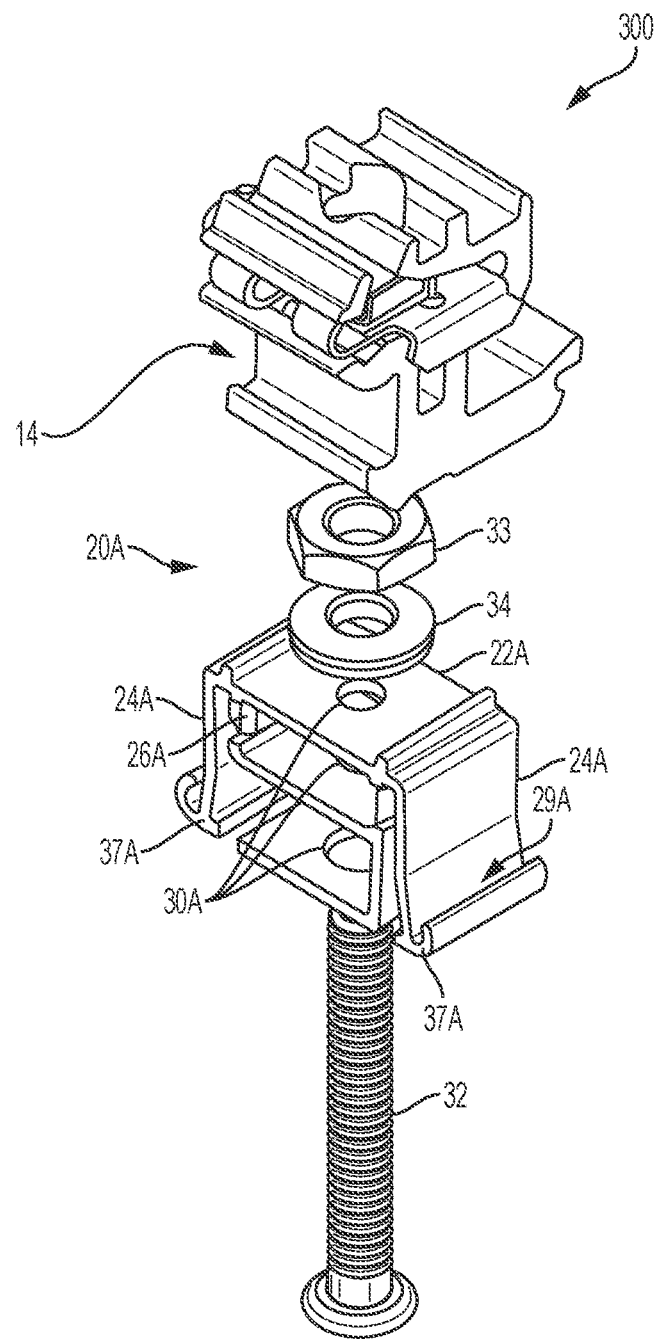
FIG. 5 shows an exploded perspective view of a coupling used in the system of FIG. 3, in accordance with an embodiment.
Figure 6:
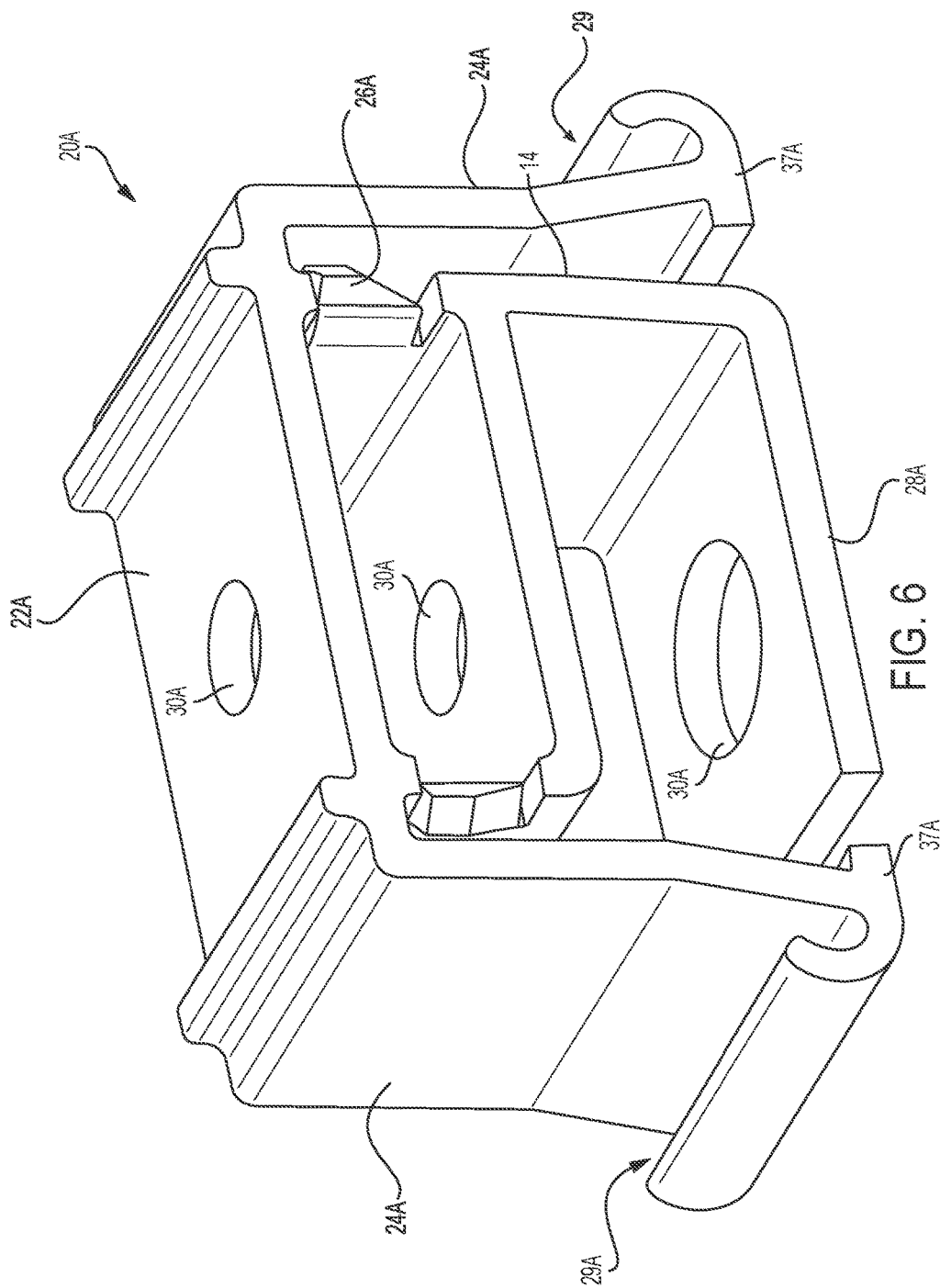
FIG. 6 shows a perspective view of a portion of the coupling of FIG. 5.
Figure 7:
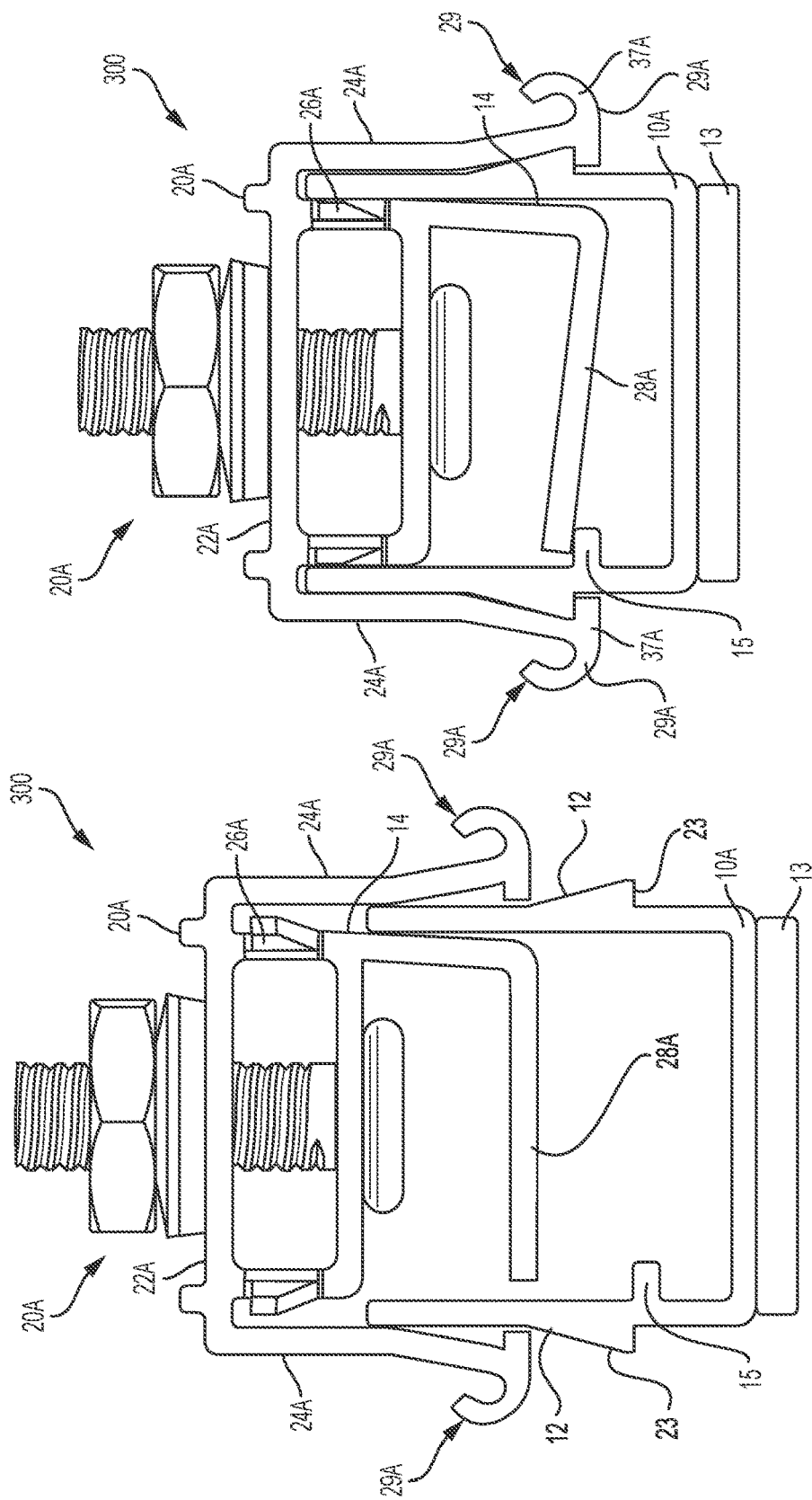
FIG. 7A shows an end view of the mounting system shown in FIG. 3 in a pre-installation position, in accordance with an embodiment.
FIG. 7B shows an end view of the mounting system shown in FIG. 3 in an installed position, in accordance with an embodiment.
Figure 8:
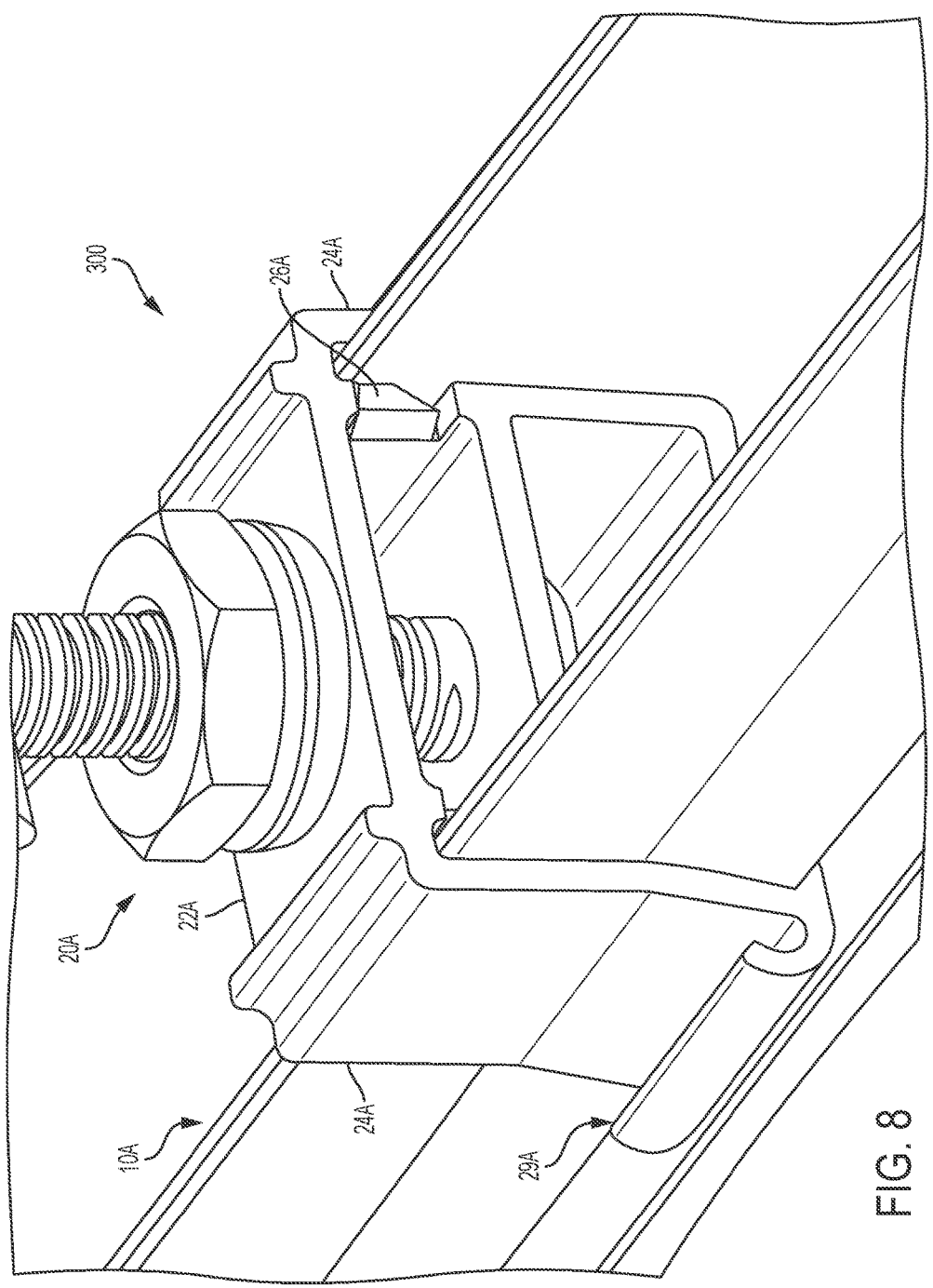
FIG. 8 shows a close-up perspective view of the mounting system shown in FIG. 3 in an installed position, in accordance with an embodiment.

As shown in FIGS. 3-5, mounting system 300 may also include connector 14. Connector 14 may be, for example, a connector similar to the rock-it connector labeled 110 and described in U.S. Published Patent Application 2014/0175244 entitled "Connecting Components For Photovoltaic Arrays." In some embodiments, connector 14 may have portions that fit into grooves in module frames so as to couple to two adjacent modules via the grooves. For example, as described in the previously mentioned application, connector 14 may have a body portion, a "key" portion extending from a first side of the body portion adapted to receive a first PV module pivot locked thereon via a groove in the first PV module, and a "tongue" portion extending from a second side of the body portion adapted to receive a second PV module slid thereon via a groove in the second PV module. However, in alternate embodiments, the modules may be grooveless, and/or different connectors 14 may be used. For example, connectors 14 may simply fit around the top and bottom edges of two adjacent modules. As shown in FIG. 5, connector 14 may be mounted to coupling assembly via stud 32, sealing waster 34, and nut 33.

Figure 9:
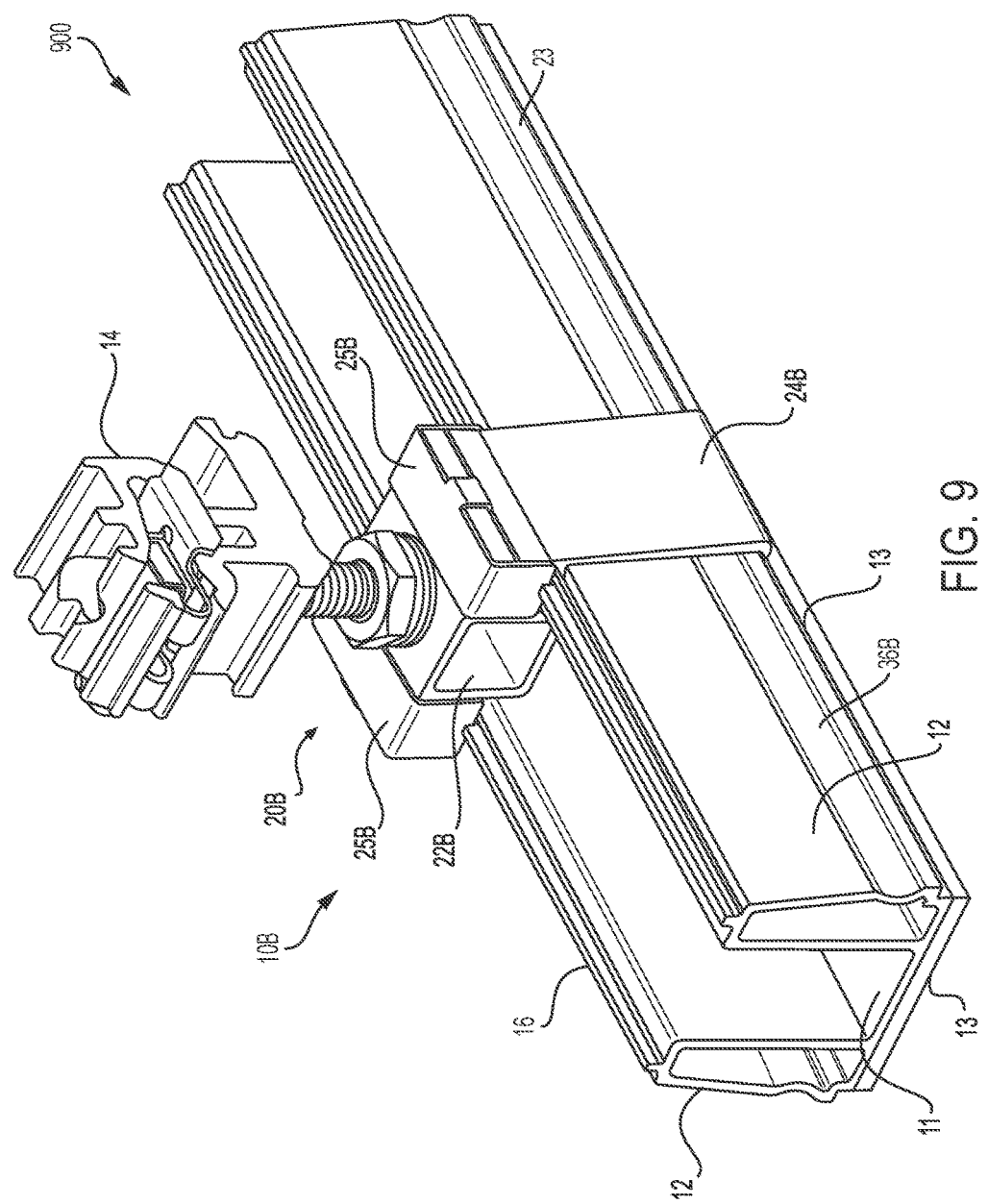
FIG. 9 shows a perspective view of a mounting system in accordance with an embodiment.
Figure 10:
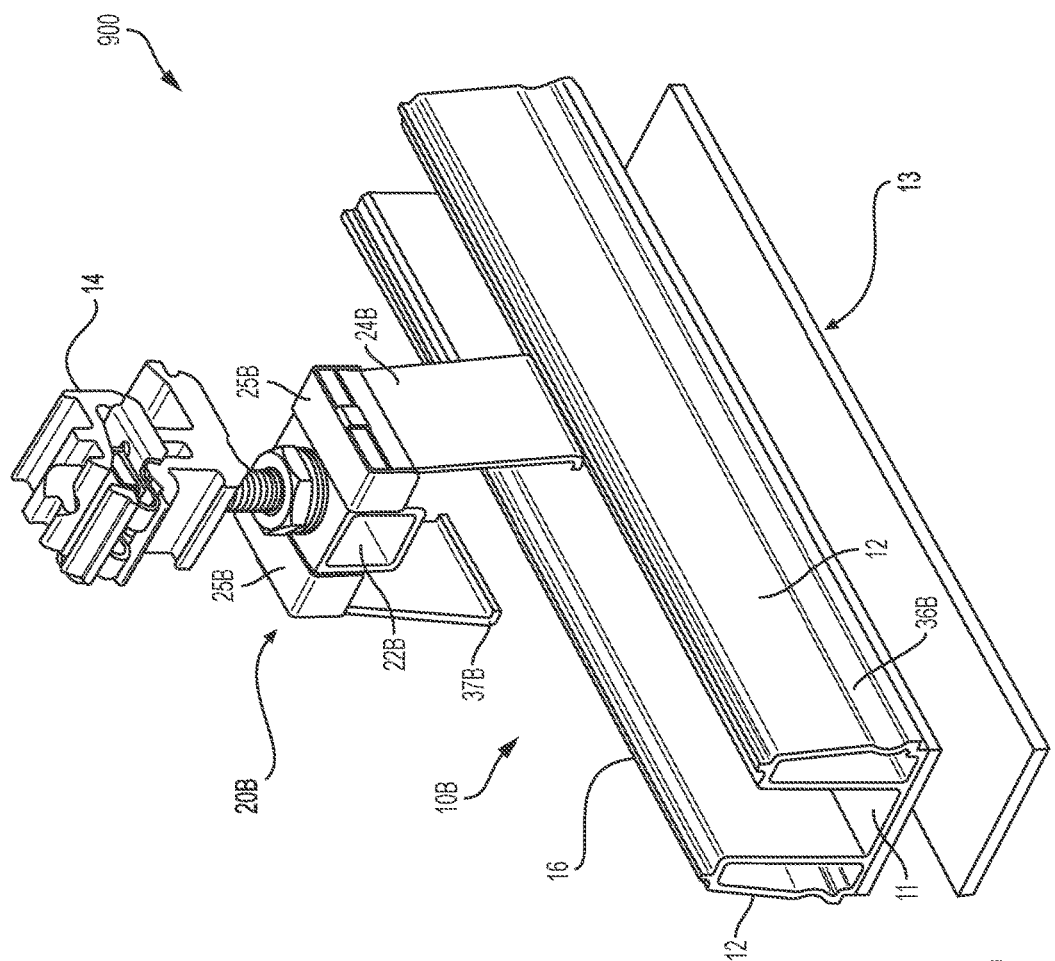
FIG. 10 shows an exploded perspective view of the mounting system shown in FIG. 9.

Referring next to FIGS. 9-16, mounting system 900 is shown, in accordance with an embodiment. Mounting system 900 may include base member 10B, coupling assembly 20B, and connector 14. Base member 10B may be similar to extruded base member 10A of mounting system 300. In the example depicted in FIGS. 9-16 (and as best seen in FIGS. 9-10), as opposed to base member 10A of mounting system 300, elongated walls 12 of extruded base member 10B of mounting system 900 may be hollowed. Moreover, base member 10B of mounting system 900 may have upper ridges 16 disposed on the top surface of each of elongated walls 12. Additionally, outer ridges 23 of elongated walls 12 may include recesses 36B. Finally, inner ridge 15 may not be included in base member 10B of mounting system 900.

Figure 11:
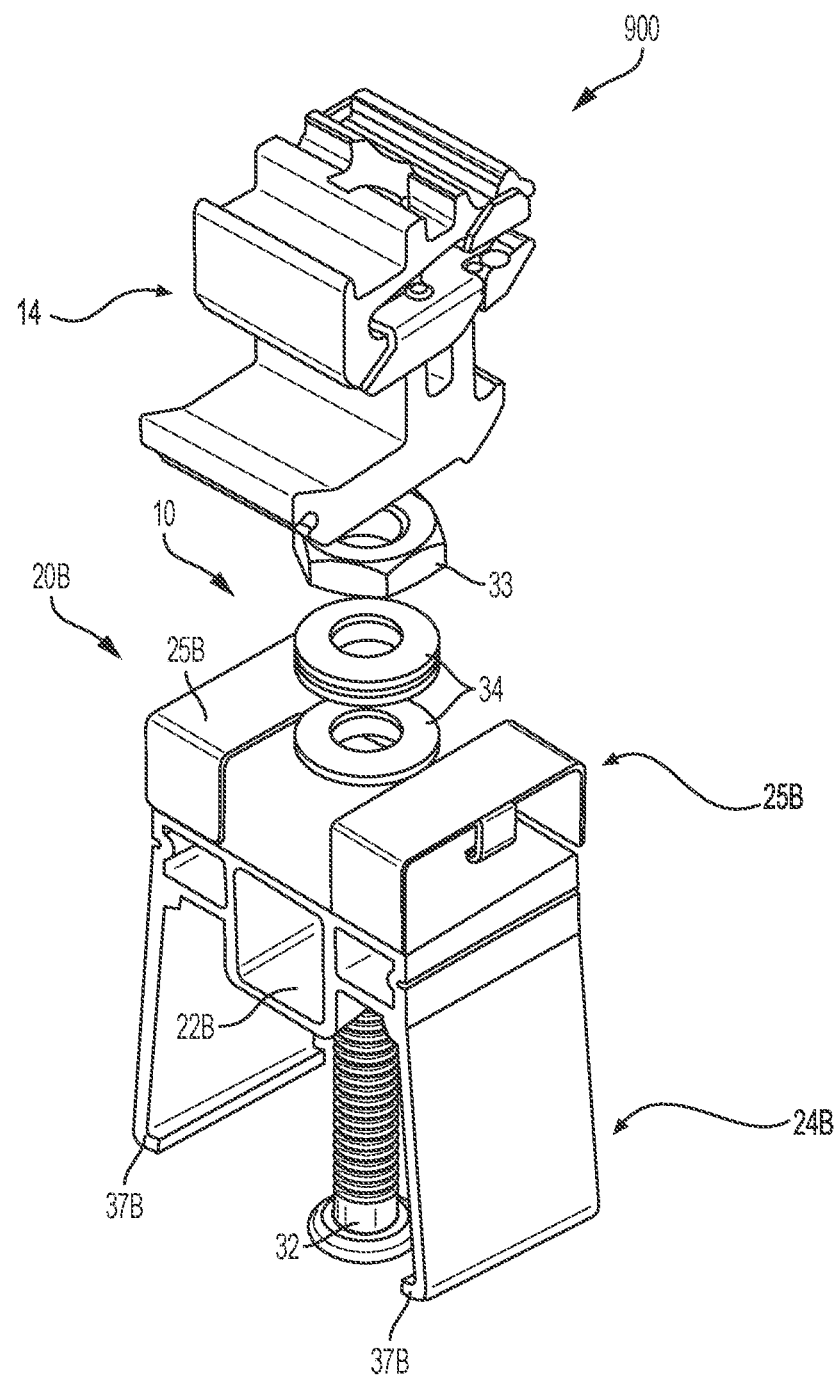
FIG. 11 shows an exploded perspective view of a coupling used in the system of FIG. 9, in accordance with an embodiment.
Figure 12:
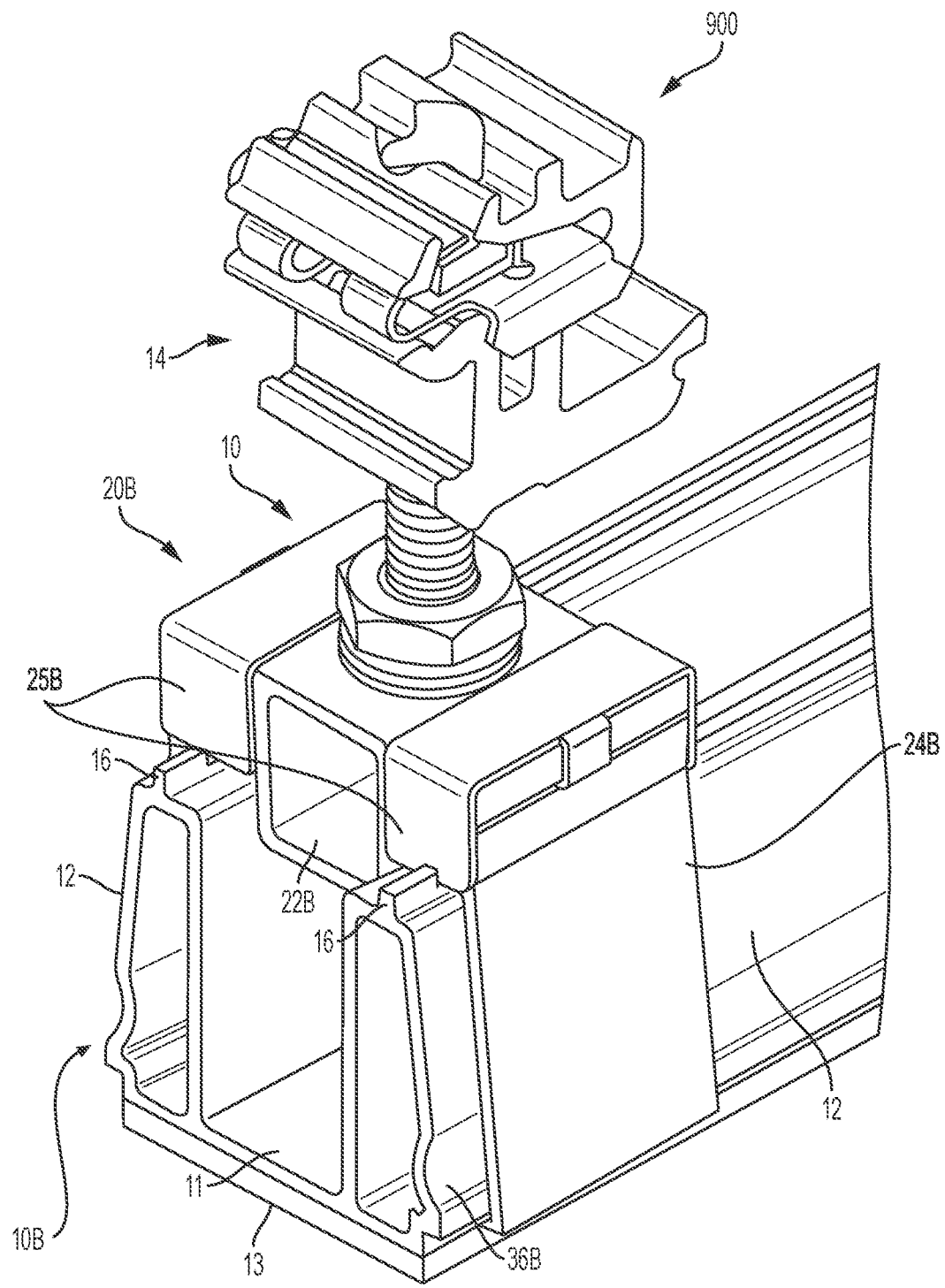
FIG. 12 shows a perspective view of the system of FIG. 9 in an installed position, in accordance with an embodiment.
Figure 13:
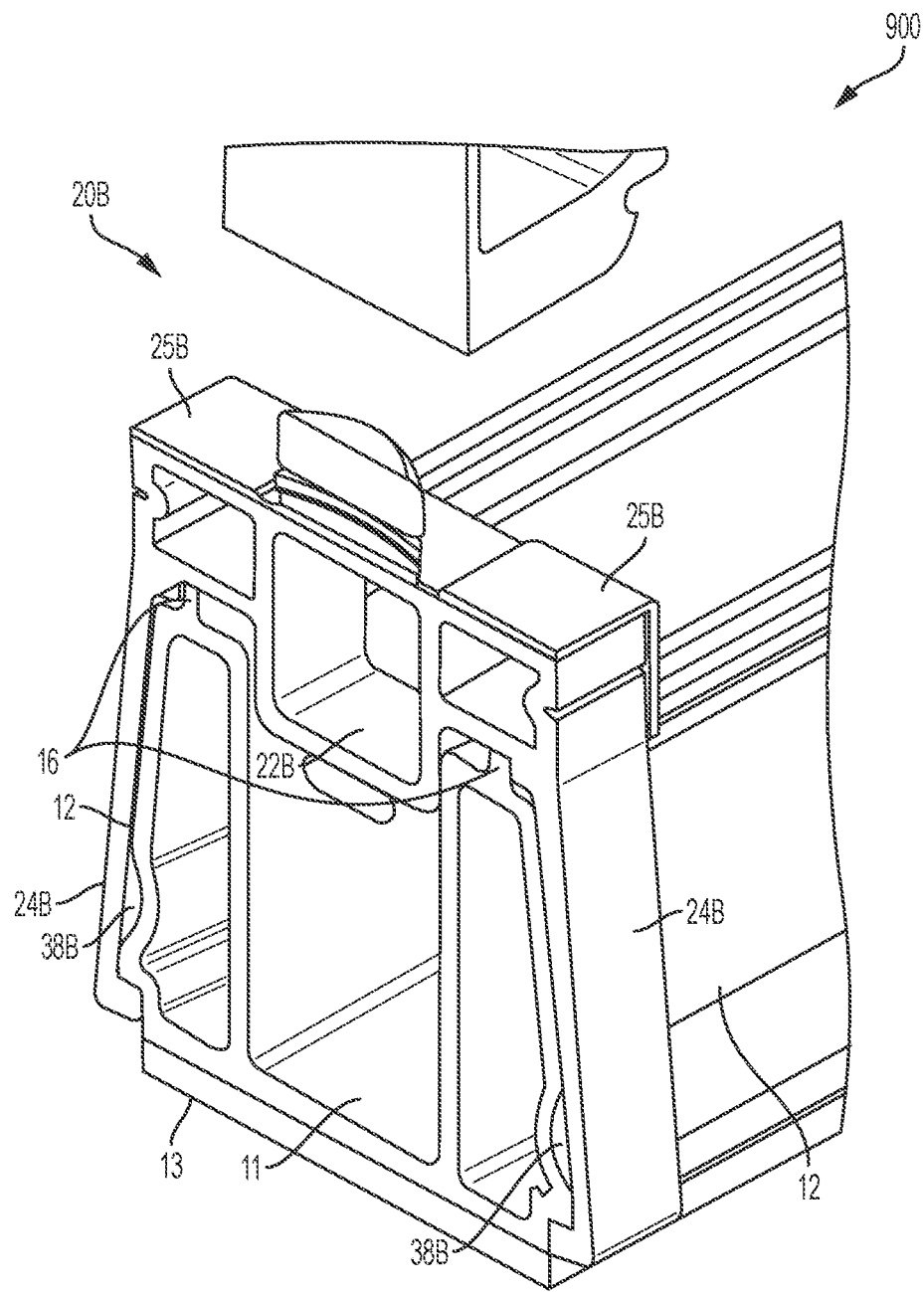
FIG. 13 shows a sectional view of the system shown in FIG. 12.

Referring to FIG. 11, coupling assembly 20B may include main body 22B having a pair of arms 24B extending outwardly therefrom. Arms 24B may be dimensioned to be wrapped around outer surfaces of elongated walls 12 of extruded base member 10B. As with arms 24A, arms 24B may include projections 37B that project inwards so as to allow arms 24B to latch around outer ridges 23. Arms 24B may thus snap to base member 10B. Coupling assembly 20B may also include a pair of clips 25B that may be connected to main body 22B as shown most clearly in FIG. 12. Clips 25B may act as a spring member and keep coupling assembly 20B secured to extruded base member. In operation, the opposite ends of clips 25B may push down against upper ridges 16 as shown most clearly in FIGS. 12 and 14. Thus, clips 25B may hold coupling assembly 20B at a preferred location along extruded base member 10B and keep it from sliding. As can be seen in FIG. 12, in some embodiments, clips 25B may penetrate base member 10B to provide the additional advantage of providing grounding as described above with respect to coupling assembly 20A. As can be seen in FIG. 13, which shows a sectional view of mounting system 900, a further advantage of the design of mounting system 900 is that a high downward force on coupling assembly 20B may be transferred from coupling assembly 20B to upper ridges 16. It will be understood that clips 25B may take up tolerances between coupling assembly 20B and extruded base member 10B and provide a spring-like buffer between coupling assembly 20B and extruded base member 10B similar to lower arm 28A as described above. Coupling assembly 20B may also include holes 30B (not shown) disposed in main body 22B, which may allow connector 14 to be mounted to coupling assembly 20B. For example, as best shown in FIG. 11, connector 14 may be mounted to coupling assembly 20B using stud 32, sealing washer 34, and nut 33.

Figure 14:
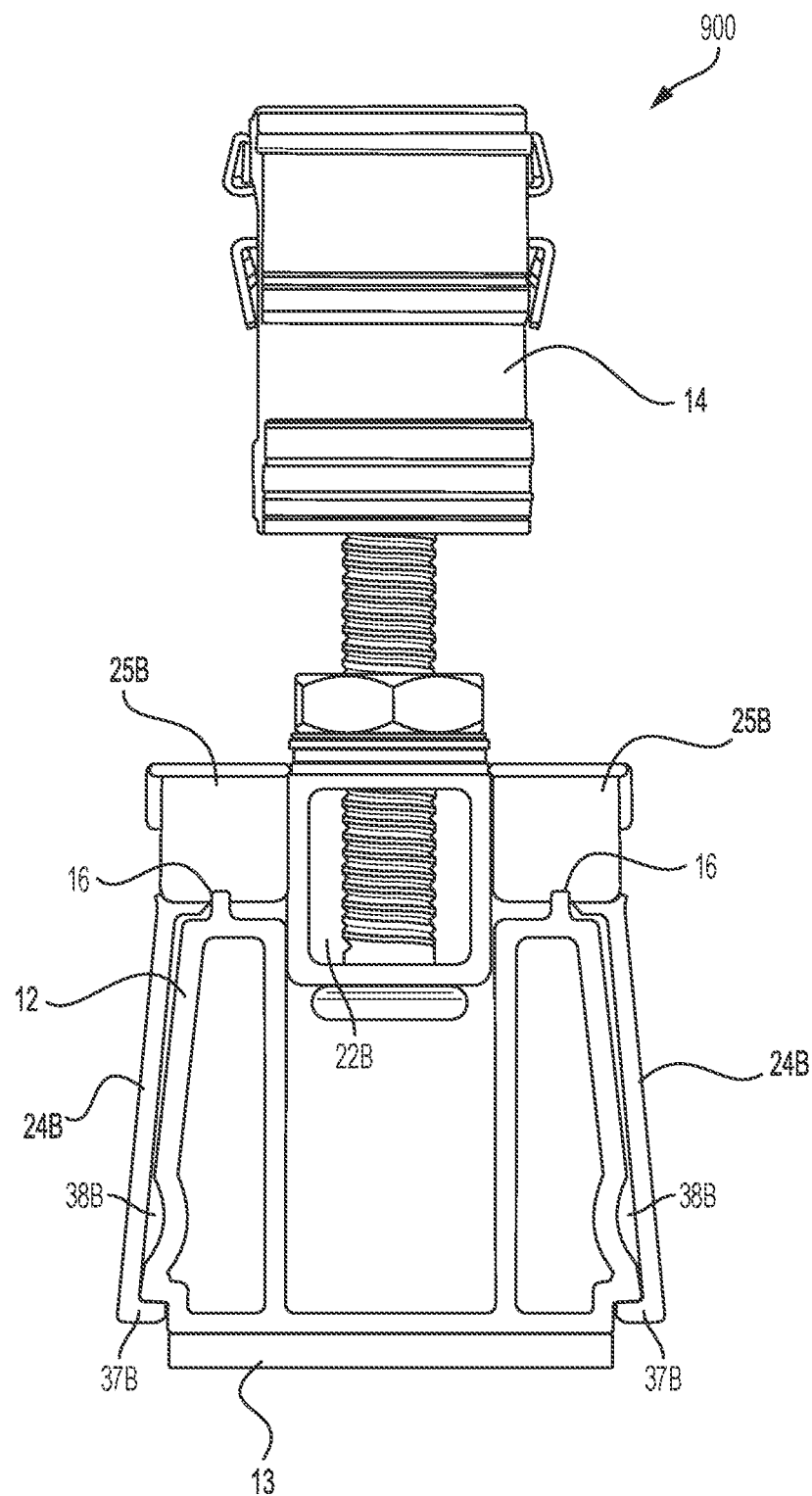
FIG. 14 shows an end view of the system shown in FIG. 12.
Figure 15:
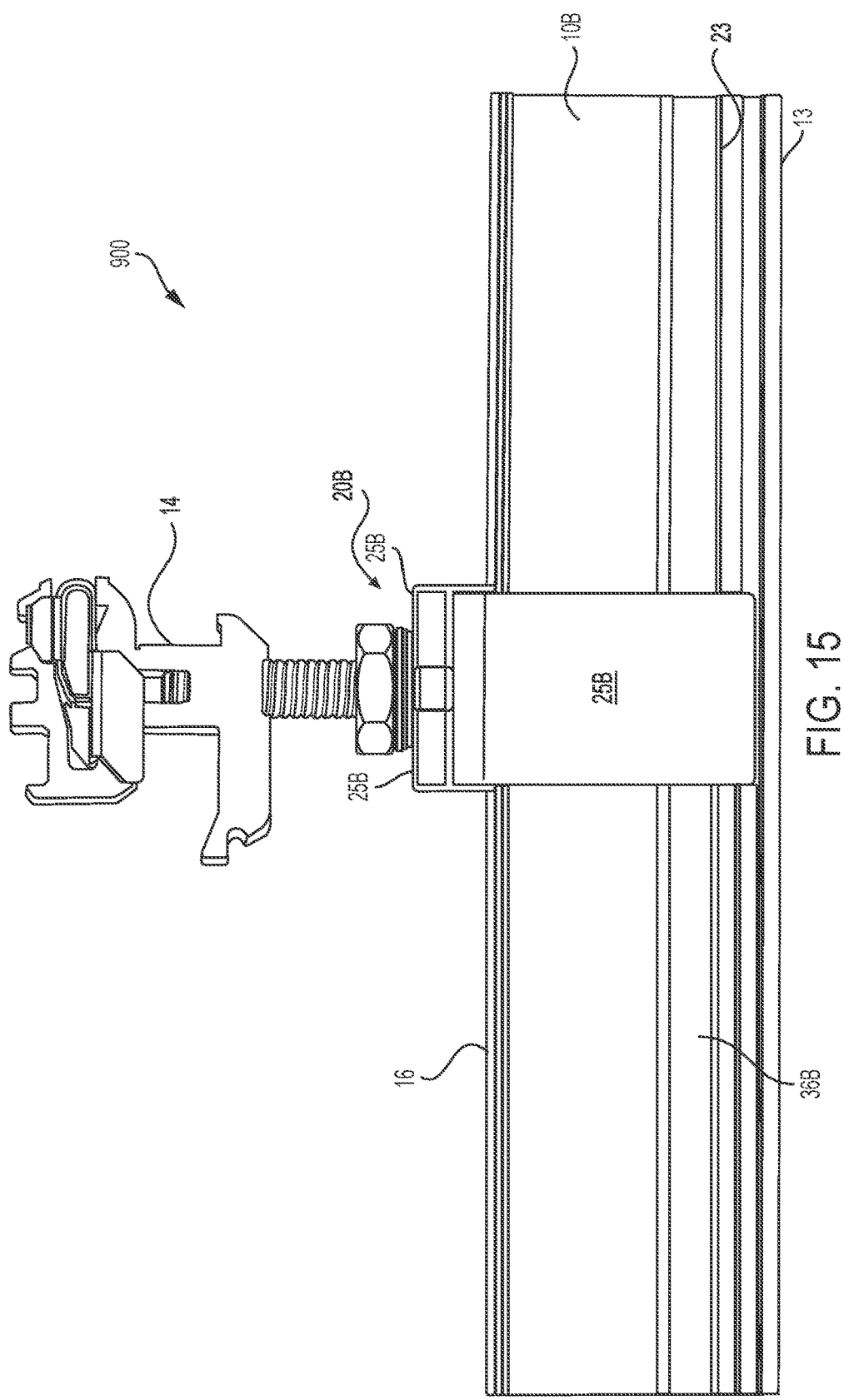
FIG. 15 shows a side elevation view of the system of FIG. 9 in an installed position.
Figure 16:
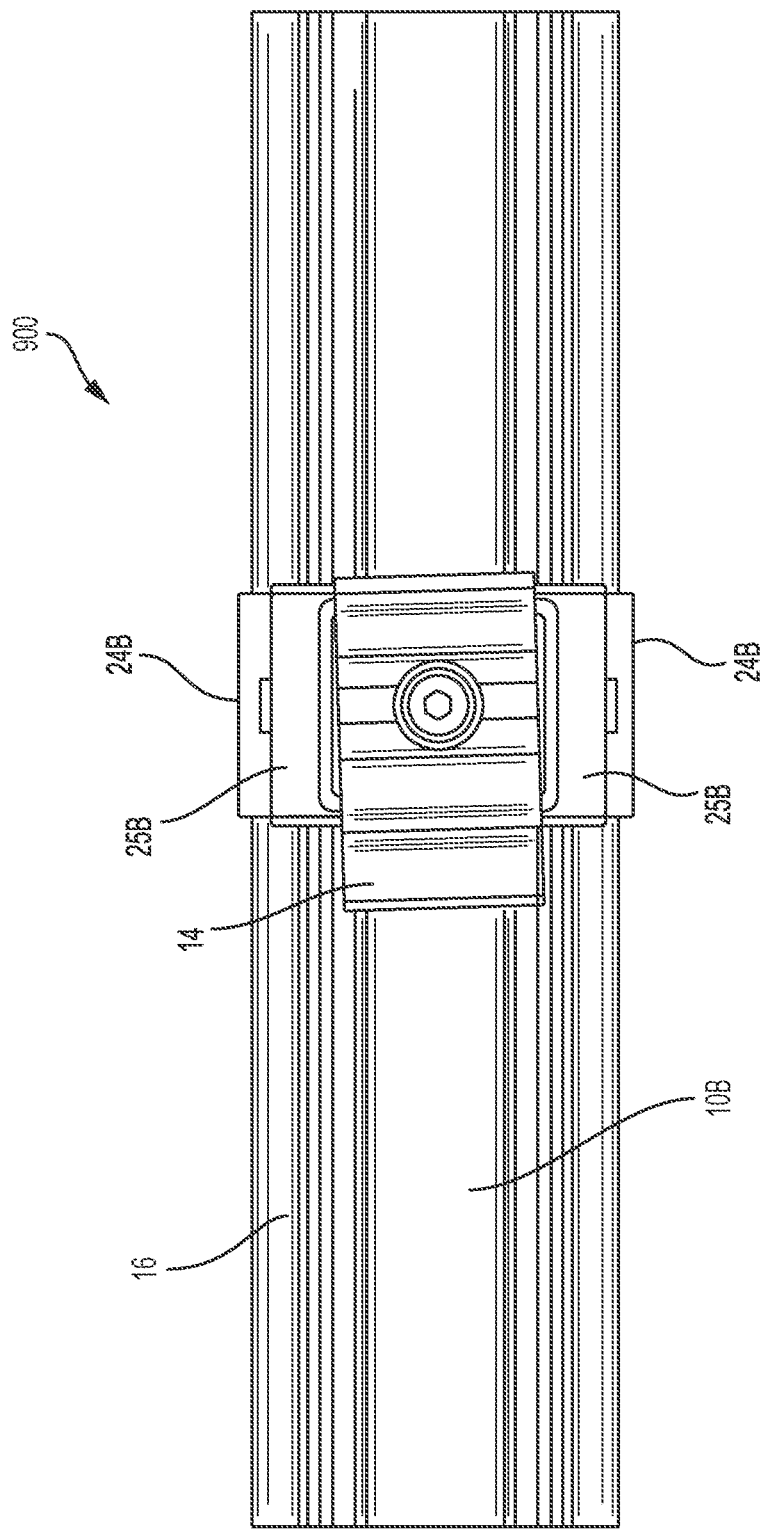
FIG. 16 shows a top plan view of the system of FIG. 9 in an installed position.
Figure 17:
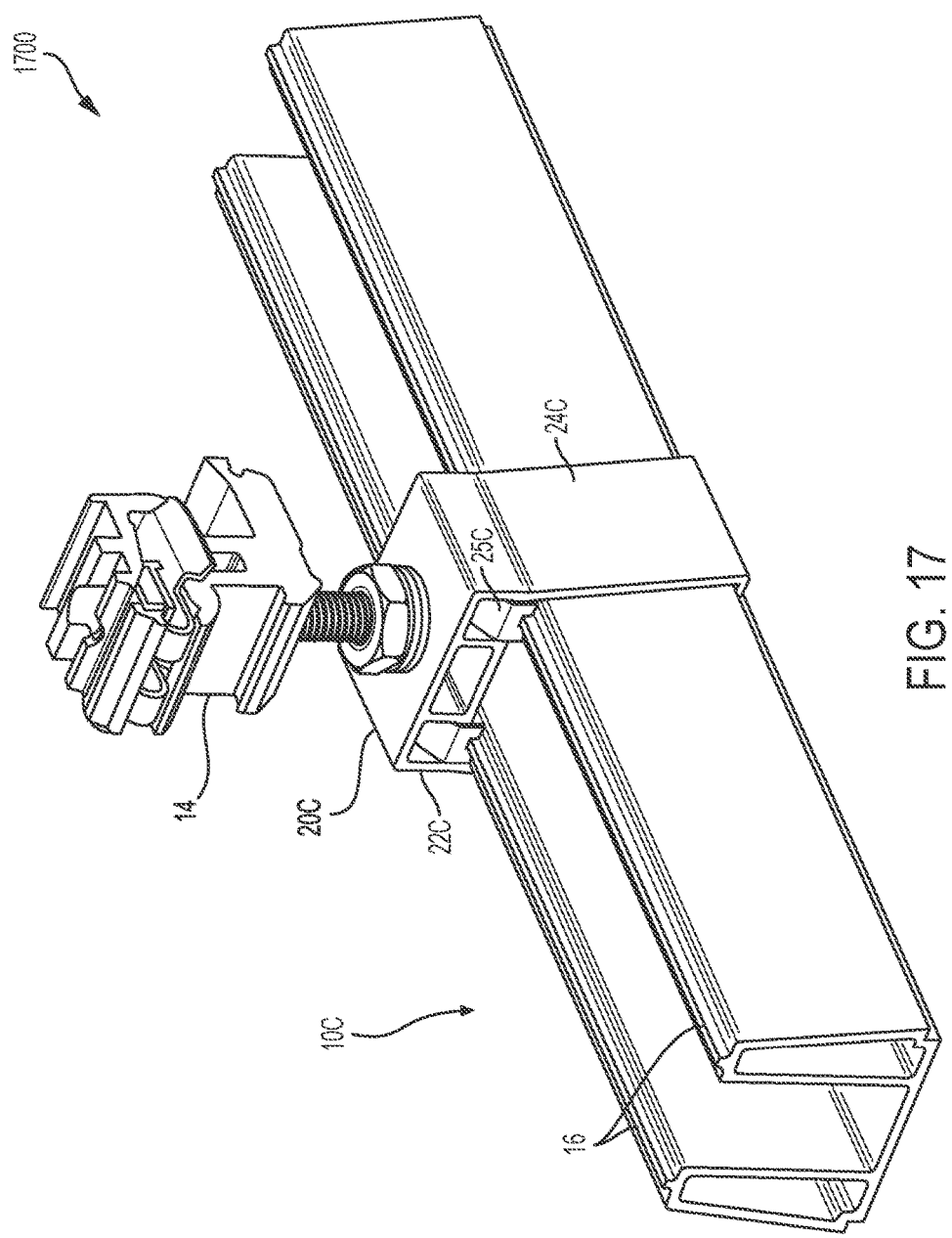
FIG. 17 shows a perspective view of a mounting system, in accordance with an embodiment.

In some embodiments, coupling assembly 20B may be detached from extruded base member 10B. As shown in FIGS. 13 and 14, recesses 36B may define gaps 38B between elongated walls 12 and the inside surfaces of arms 24B. In some embodiments, coupling assembly 20B may be detached from extruded base member 10B by inserting the end of a screwdriver (or other tool sized to fit therein) into gaps 38B and prying arms 24B off of outer ridges 23.

In some embodiments, upper ridges 16 may act as a guide to find the right location for coupling assembly 20B. For example, coupling assembly may be rotated 90 degrees relative to connector 14 so that arms 24B fit between upper ridges 16 and allow an installer to slide couping assembly 20B along base member 10B until the desired location is determined (based on the position of the PV modules, for example). Once the desired location is determined, coupling assembly 20B may be rotated back to the position shown in FIG. 10 and locked into place as described above.

Figure 18:
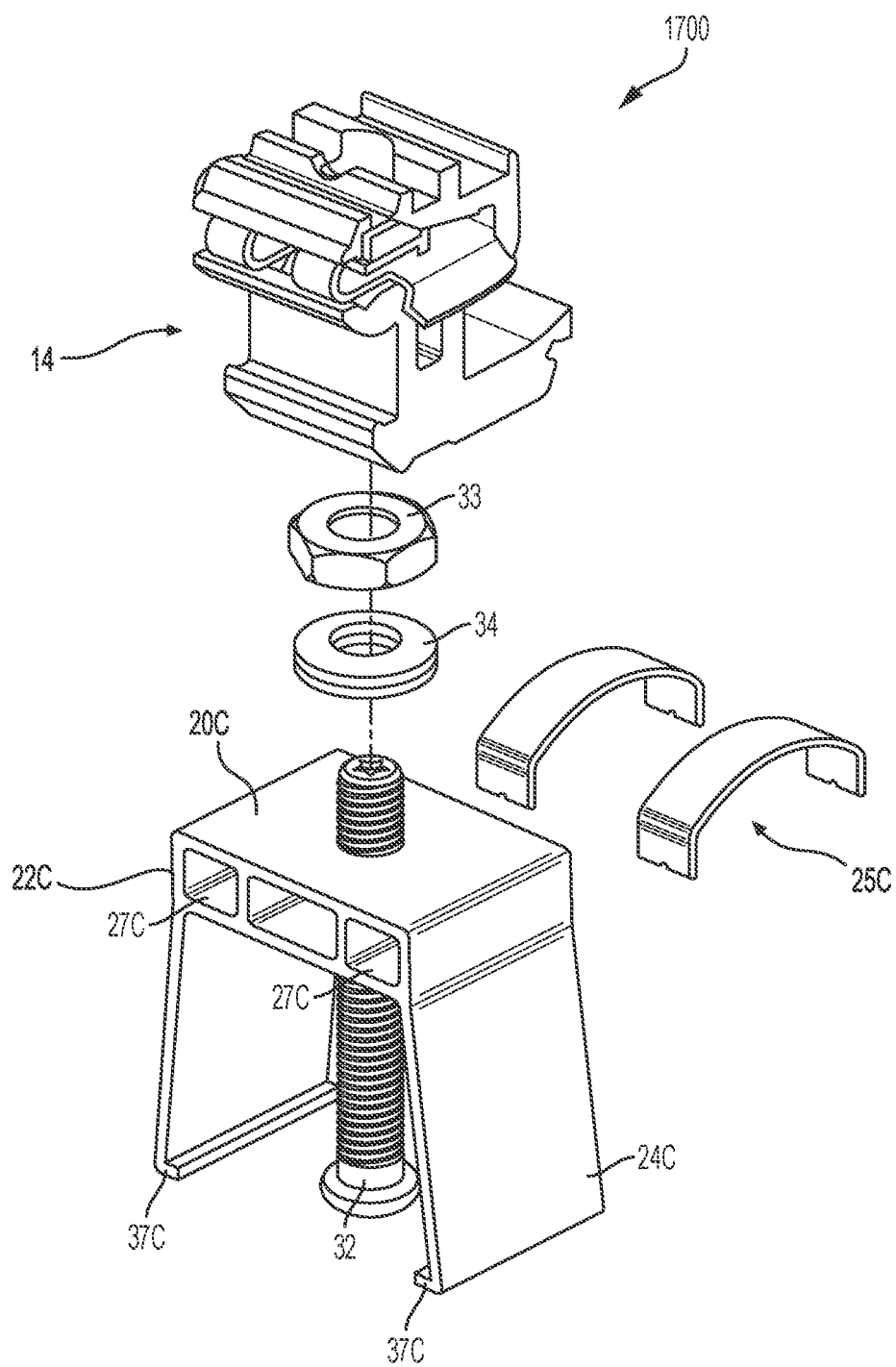
FIG. 18 shows an exploded perspective view of the mounting system shown in FIG. 17.
Figure 19:
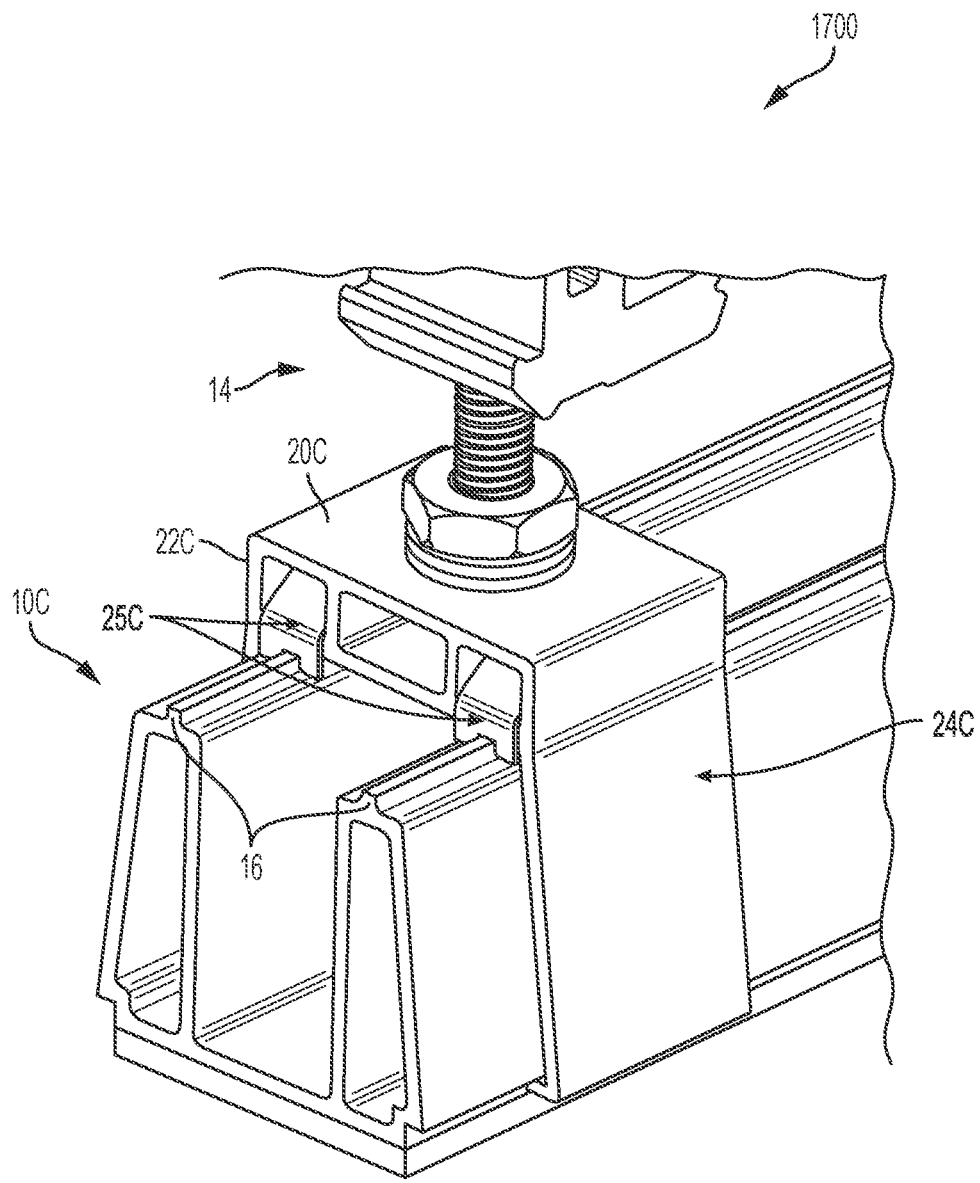
FIG. 19 shows a perspective view of the system of FIG. 17 in an installed position, in accordance with an embodiment.
Figure 20:
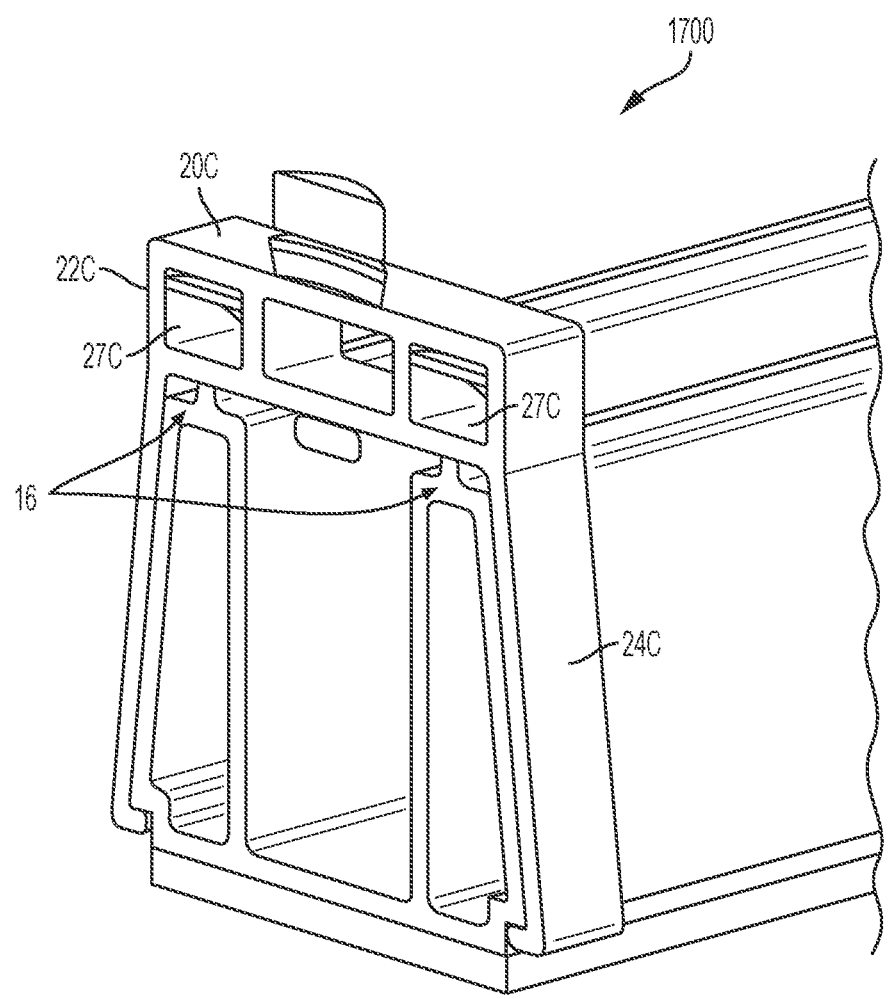
FIG. 20 shows a sectional view of the system shown in FIG. 18.

Referring next to FIGS. 17-20, mounting system 1700 is shown, in accordance with an embodiment. As can be seen, mounting system 1700 may be similar to mounting system 900. For example, mounting system 1700 also may include base member 10C and connector 14, which may include some or all of the features described above with respect to like numbered components of mounting system 900. Additionally, mounting system 1700 may also include coupling assembly 20C, similar to coupling assembly 20B described above. For example, as seen in FIG. 18, coupling assembly 20C may include main body 22C having a pair of arms 24C extending outwardly therefrom. As with arms 24B of coupling assembly 20B, arms 24C may be dimensioned to be wrapped around outer surfaces of elongated walls 12 of extruded base member 10C and may include projections 37C that project inwards so as to allow arms 24C to latch around outer ridges 23. Coupling assembly 20C may also include a pair of clips 25C that operate similar to clips 25B in taking up tolerances and providing a spring-like buffer between coupling assembly 20C and extruded base member 10C. However, clips 25C, rather than wrapping around the top surface of coupling assembly 20C, may pass through apertures 27C which pass through main body 22C, as shown in FIGS. 18 and 20. FIG. 19 shows a close-up perspective view of coupling assembly 20C attached to extruded base member 10C. As can be seen in FIG. 19, clips 25C pass through apertures 27C of coupling assembly 20C and rest on upper ridges 16. As described above with respect to mounting system 900, upper ridges 16 may act as a guide to find the right location for coupling assembly 20C. For example, coupling assembly 20C may be rotated 90 degrees relative to connector 14 so that arms 24C fit between upper ridges 16 and allow an installer to slide couping assembly 20C along base member 10C until the desired location is determined (based on the position of the PV modules, for example). Once the desired location is determined, coupling assembly 20C may be rotated back to the initial position and locked into place as described above and shown in FIG. 17.

Figure 21:
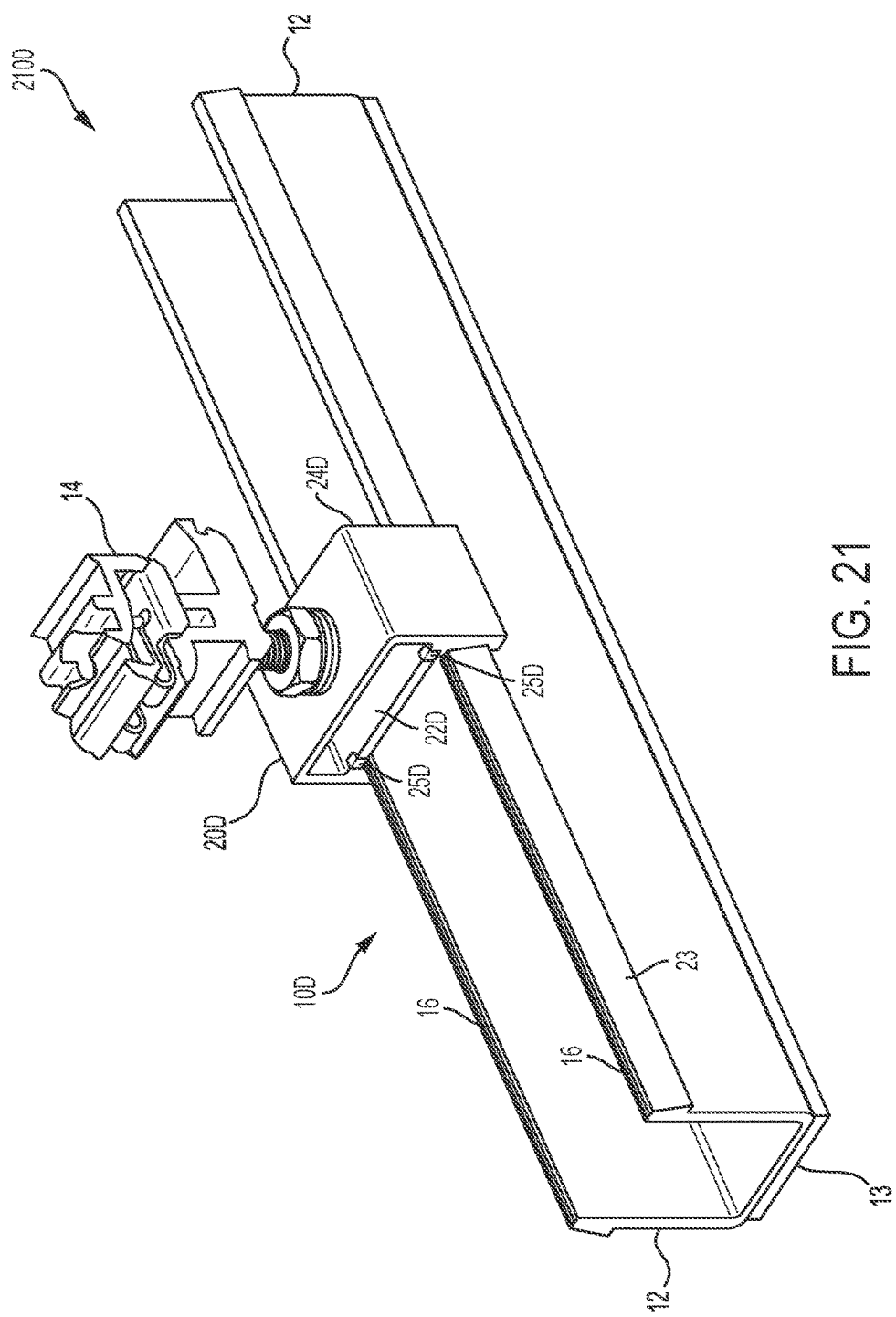
FIG. 21 shows a perspective view of a mounting system, in accordance with an embodiment.
Figure 22:
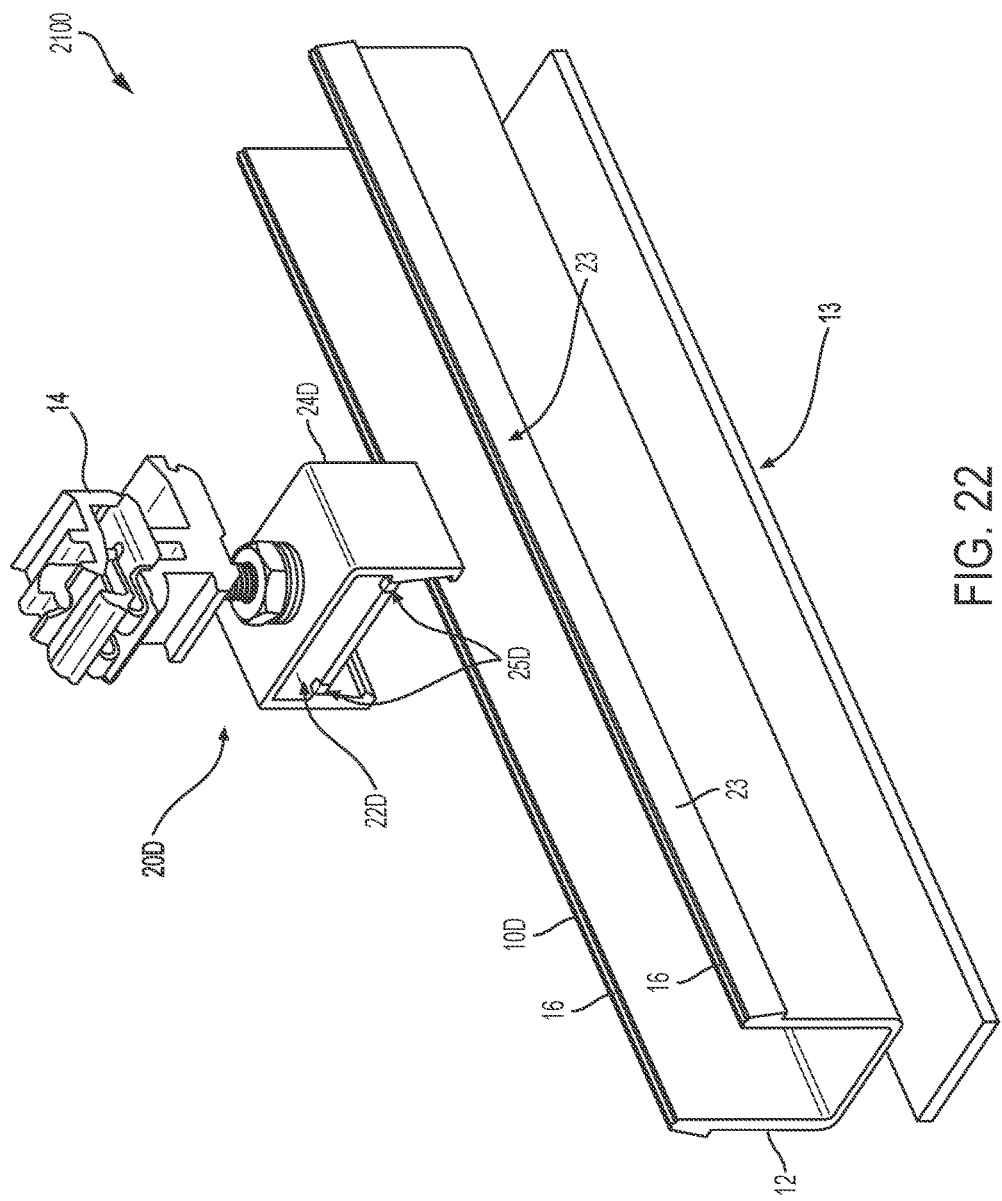
FIG. 22 shows an exploded perspective view of the mounting system shown in FIG. 21.

Referring next to FIGS. 21-24, mounting system 2100 is shown, in accordance with an embodiment. As can be seen in FIGS. 21-24, mounting system 2100 may be similar to mounting systems 300, 900, and 1700 described above. For example, mounting system 2100 may include extruded base member 10D and connector 14, which may include some or all of the features described above with respect to like-numbered components of mounting systems 300, 900, and 1700 described above. In the example depicted in FIGS. 21-24, extruded base member 10D of mounting system 2100 may be similar to extruded base member 10A of mounting system 300, with center base 11, and a pair of upwardly extending elongated walls 12. In contrast to mounting system 300, ridges 23 may be disposed closer to the top of elongated walls 12. However, it will be understood that ridges 23 may also be disposed lower on elongated walls 12 as described above with respect to mounting system 300, depending on the geometry of coupling assembly 20D. Additionally, as shown in FIGS. 21 and 22, upper ridges 16 (similar to those described in mounting systems 900 and 1700) may be provided on top surfaces of elongated walls 12.

Figure 23:
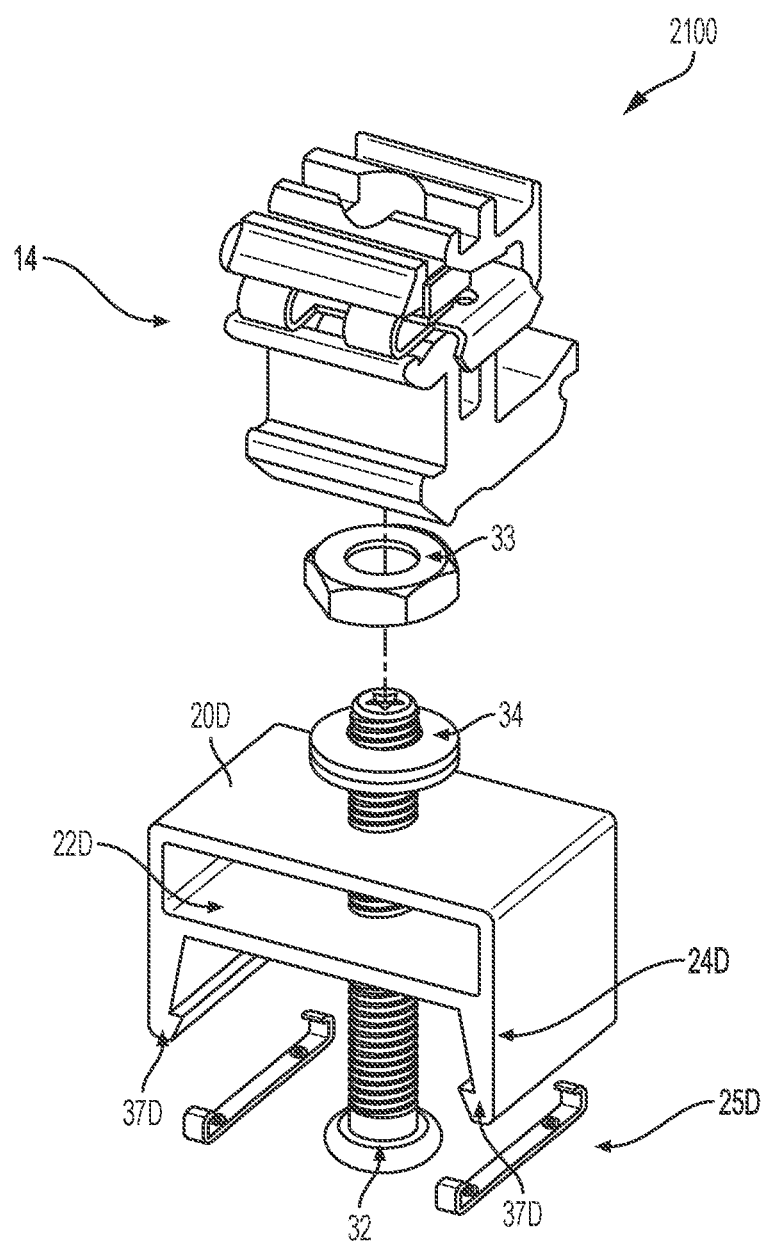
FIG. 23 shows an exploded perspective view of a coupling used in the system of FIG. 21, in accordance with an embodiment.
Figure 24B:
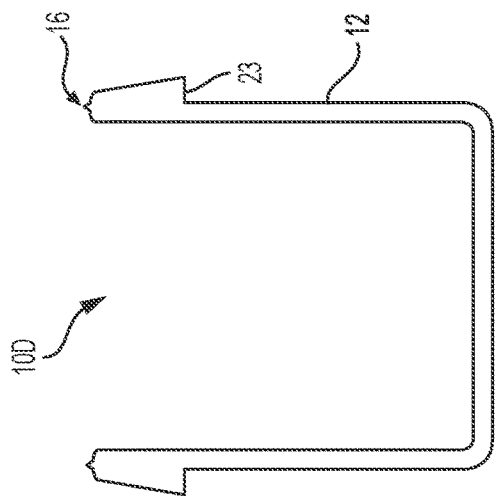
FIGS. 24A-24C show components of the mounting system shown in FIG. 21.
Figure 24C:
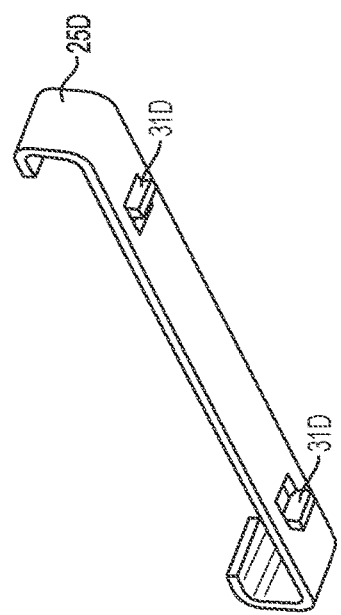
Figure 24A:
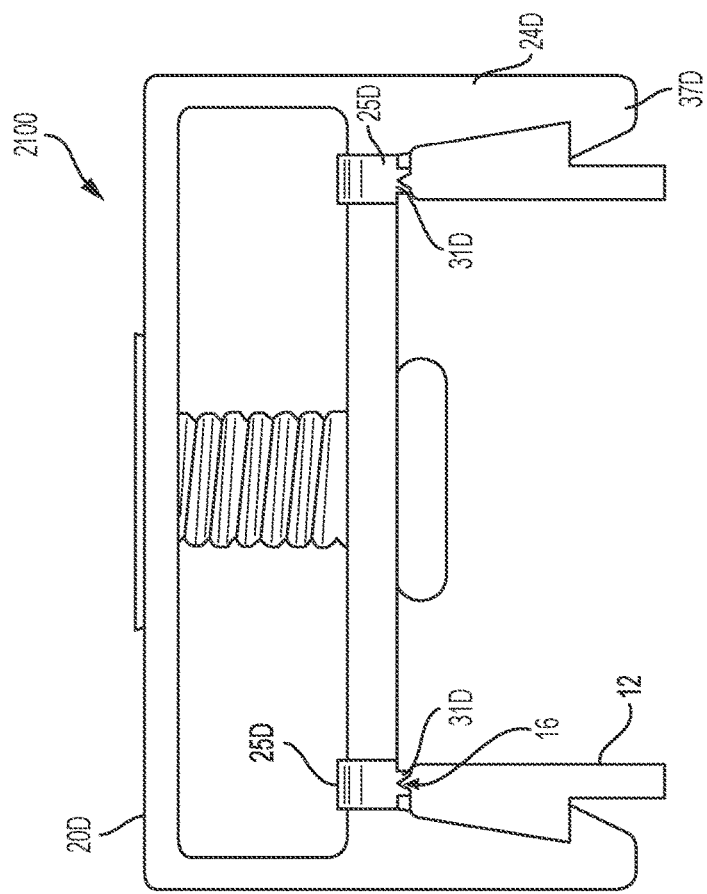
Figure 25:
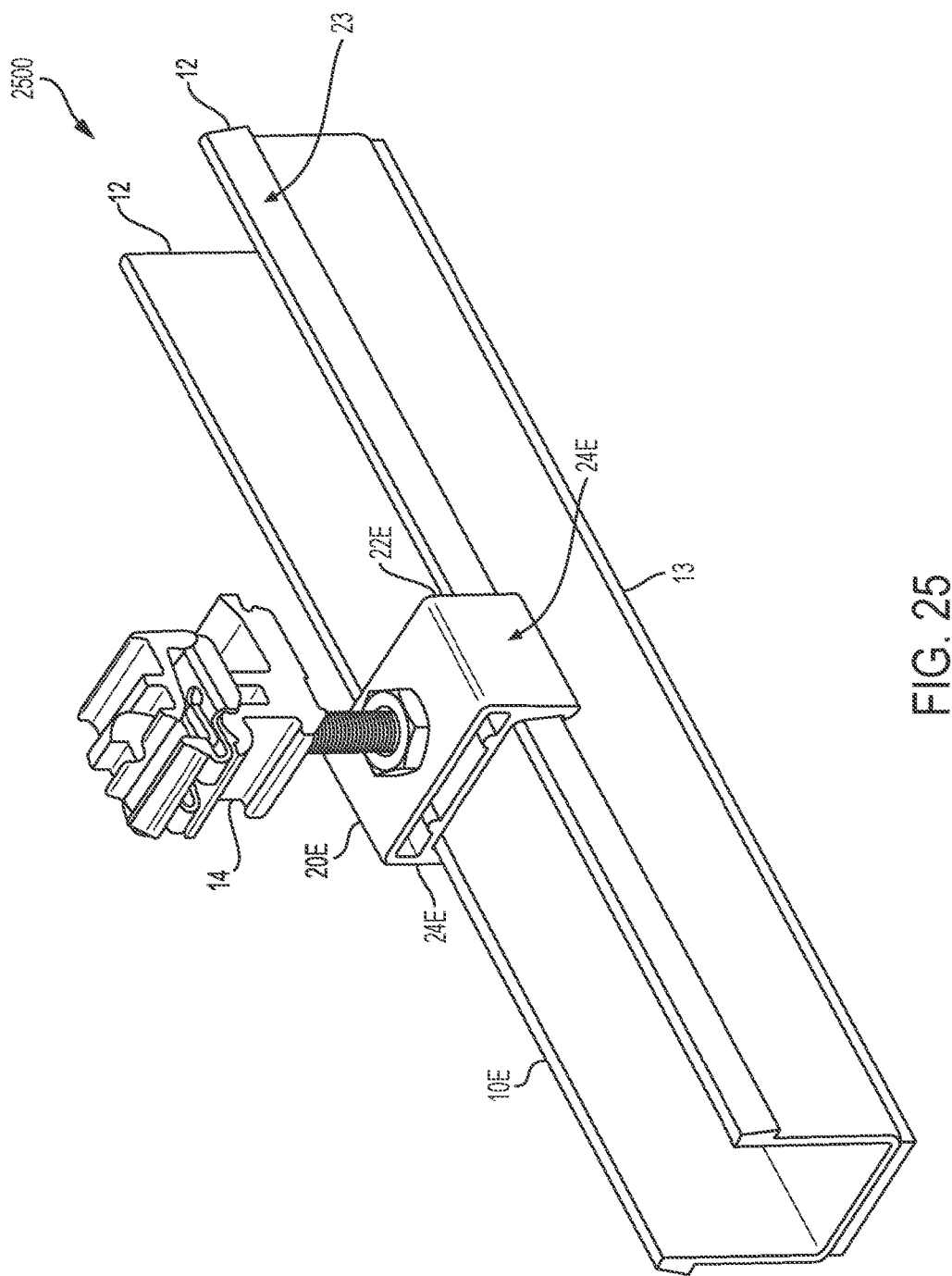
FIG. 25 shows a perspective view of a mounting system, in accordance with an embodiment.
Figure 26:
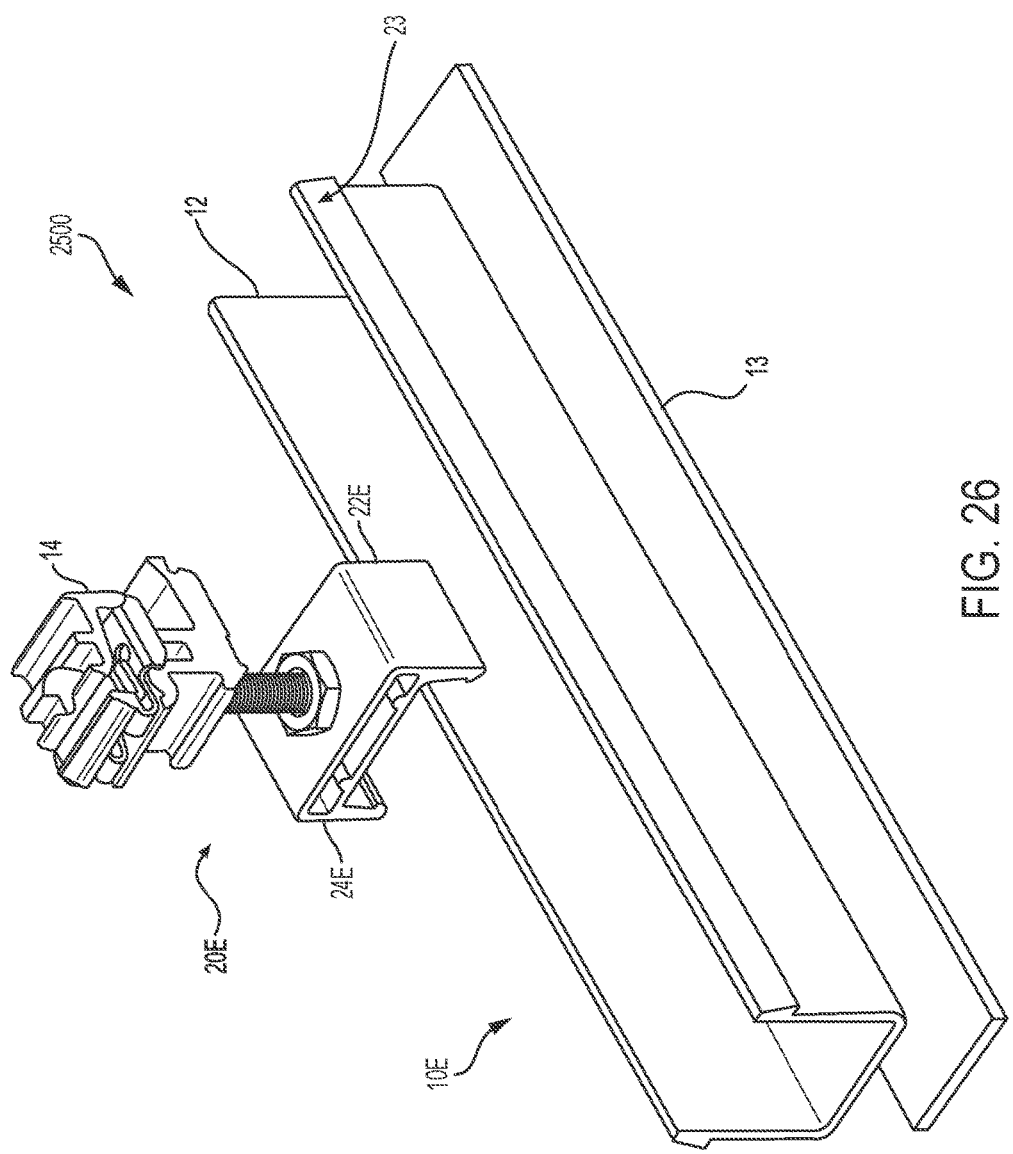
FIG. 26 shows an exploded perspective view of the mounting system shown in FIG. 25.
Figure 27:
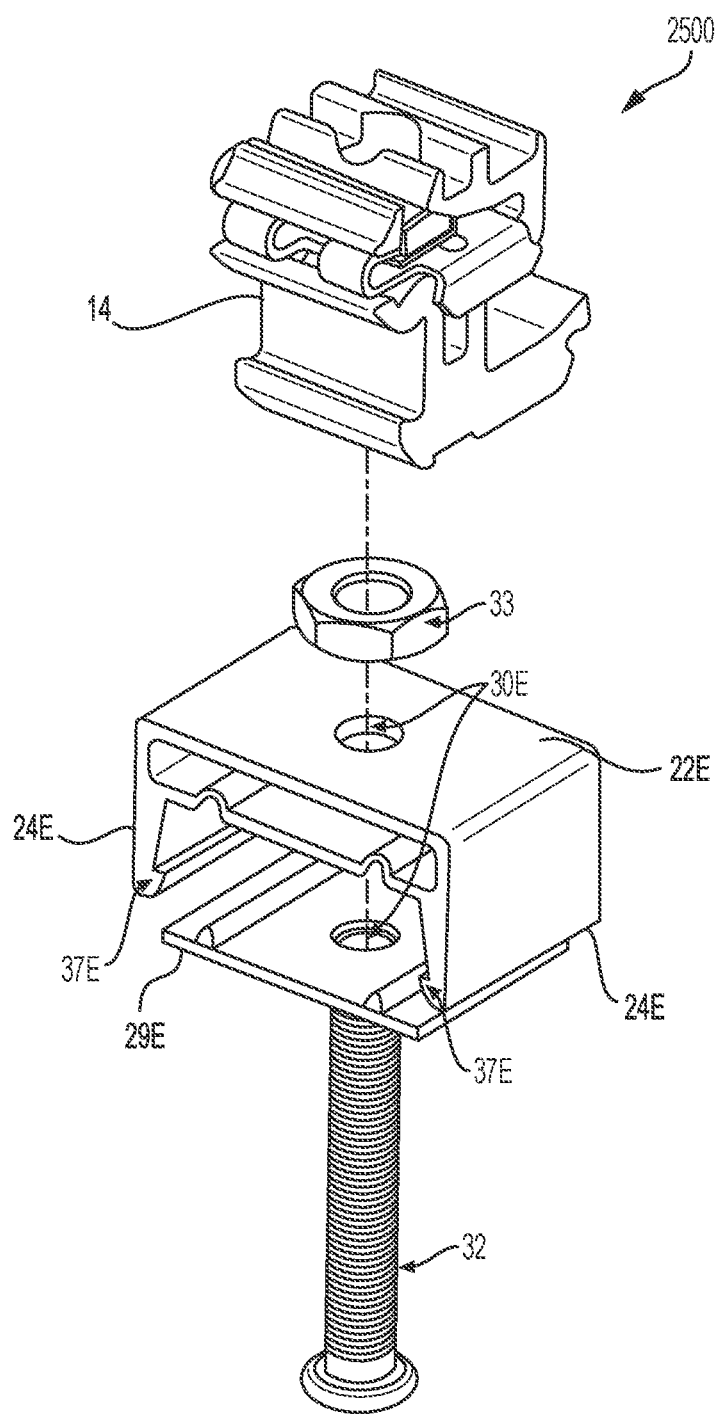
FIG. 27 shows an exploded perspective view of a coupling used in the system of FIG. 25, in accordance with an embodiment.

Mounting system 2100 may also include coupling assembly 20D, which may operate similar to coupling assemblies 20A-20C described above. For example, as seen in FIG. 23, coupling assembly 20D may include main body 22D having a pair of arms 24D extending outwardly therefrom. As with arms 24B and 24C of coupling assemblies 20B and 20C, arms 24D may be dimensioned to be wrapped around outer surfaces of elongated walls 12 of extruded base member 10D and may include projections 37D that project inwards so as to allow arms 24D to latch around outer ridges 23. Coupling assembly 20D may also include a pair of clips 25D that operate similar to clips 25B and 25C in taking up tolerances and providing a spring-like buffer between coupling assembly 20D and extruded base member 10D. However, in contrast to the previously described clips, clips 25D may wrap around the bottom of a portion of main body 22D as shown in FIGS. 21 and 22. Additionally, as best seen in FIGS. 24A and 24C, clips 25D may each have bottom indents 31D, which may extend from the bottom surface of clips 25D. As shown in FIG. 24A, when coupling assembly 20D is snapped onto extruded base member 10, each indent 31D may push down on ridge 16 and thereby keep main body 22D from sliding along extruded base member 10D.

As described above with respect to mounting systems 900 and 1700, upper ridges 16 may act as a guide to find the right location for coupling assembly 20D. For example, coupling assembly 20D may be rotated 90 degrees relative to connector 14 so that arms 24D fit between upper ridges 16 and allow an installer to slide couping assembly 20D along base member 10D until the desired location is determined (based on the position of the PV modules, for example). Once the desired location is determined, coupling assembly 20D may be rotated back to the position shown in FIG. 22 and locked into place as described above.

Referring next to FIGS. 25-28, mounting system 2500 is shown, in accordance with an embodiment. As can be seen in FIGS. 25-28, mounting system 2500 may be similar to mounting systems 300, 900, 1700, and 2100 described above. For example, mounting system 2500 may include extruded base member 10E and connector 14, which may include some or all of the features described above with respect to like-numbered components of mounting systems 300, 900, 1700, and 2100 described above. In the example depicted in FIGS. 25-28, extruded base member 10E of mounting system 2500 may be similar to extruded base member 10A of mounting system 300, with center base 11, and a pair of upwardly extending elongated walls 12. In contrast to mounting system 300, ridges 23 may be disposed closer to the top of elongated walls 12. However, it will be understood that ridges 23 may also be disposed lower on elongated walls 12 as described above with respect to mounting system 300 depending on the geometry of coupling assembly 20E.

Figure 28:
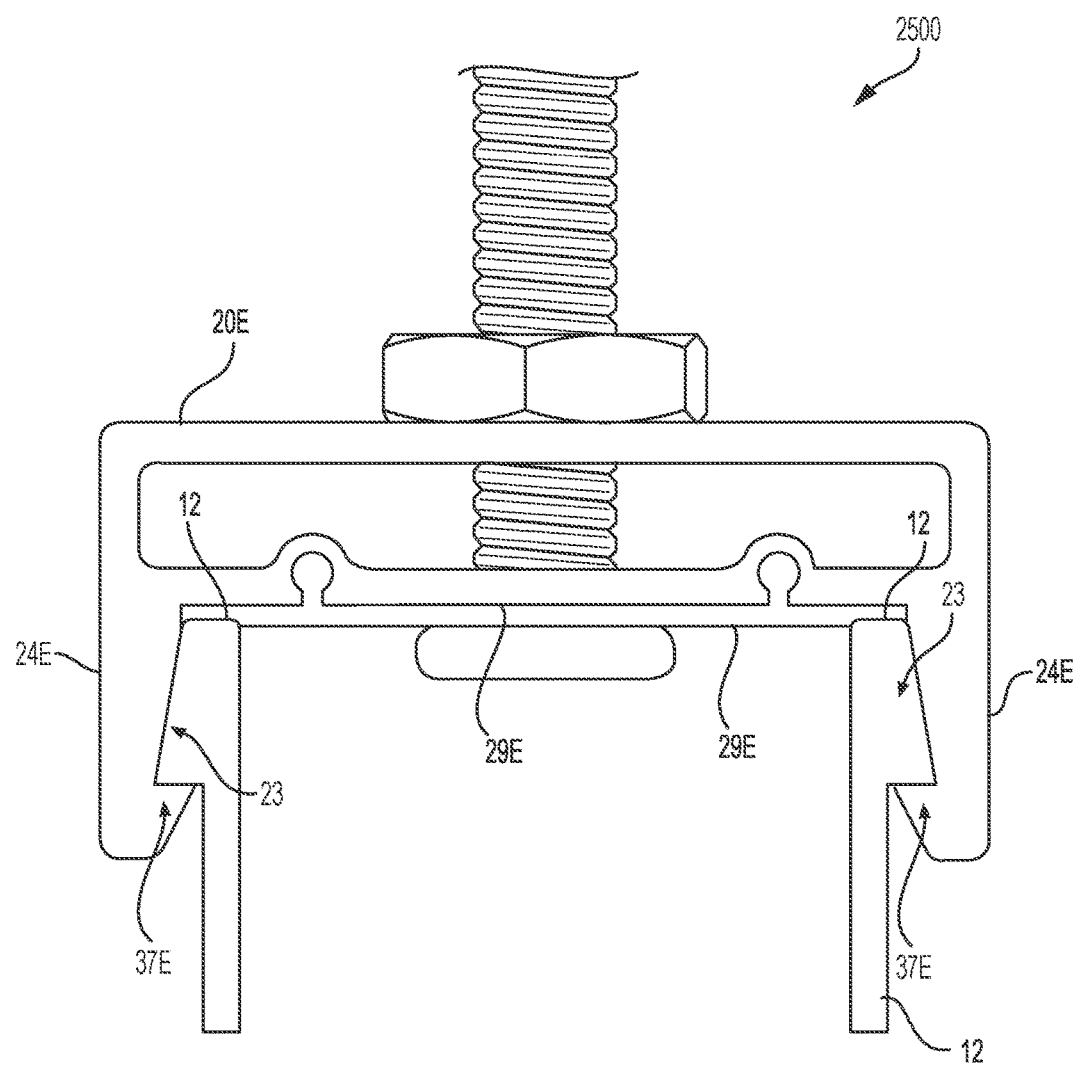
FIG. 28 shows a partial side elevation view of the system of FIG. 25 in an installed position, in accordance with an embodiment.
Figure 29:
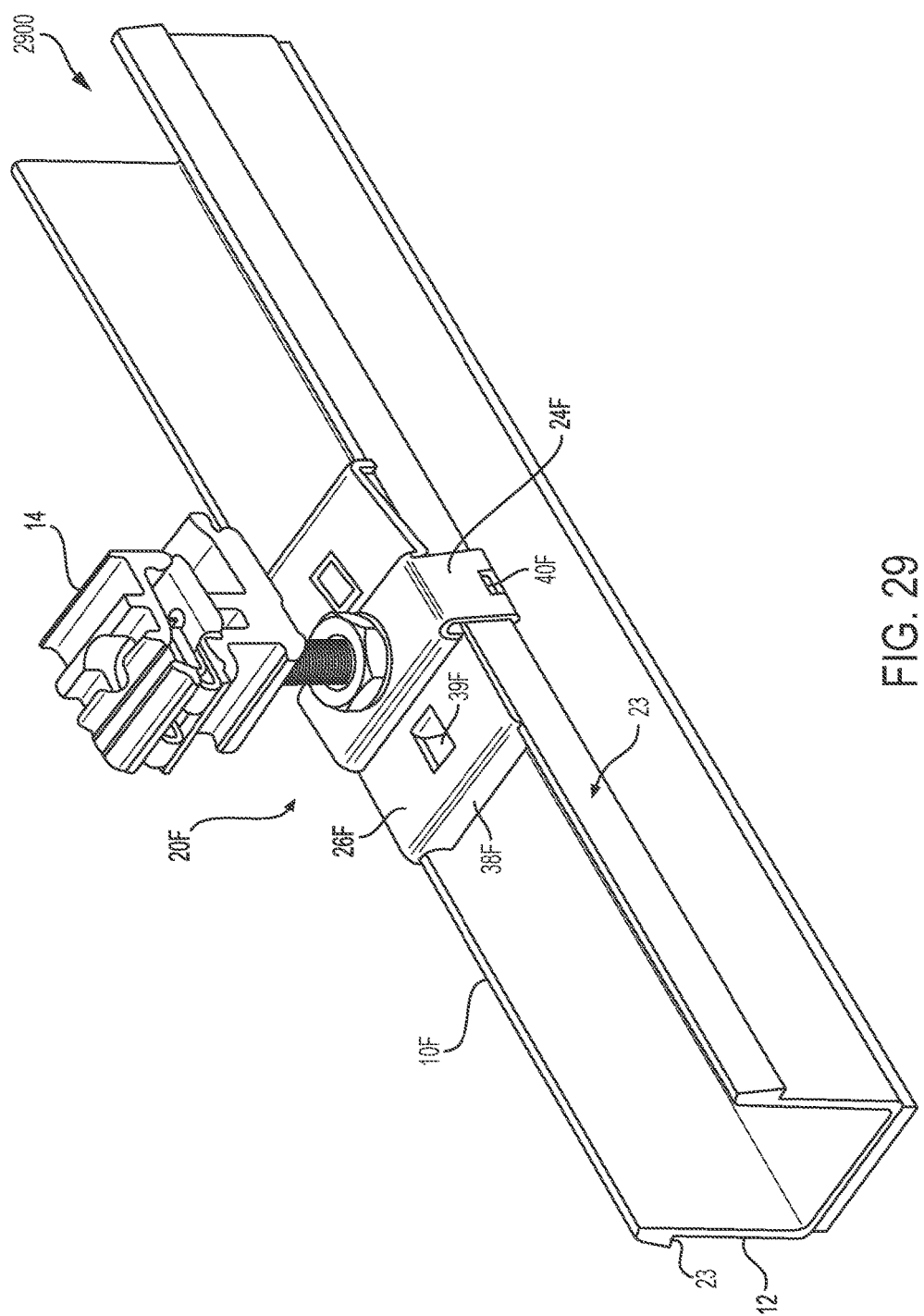
FIG. 29 shows a perspective view of a mounting system, in accordance with an embodiment.
Figure 30:
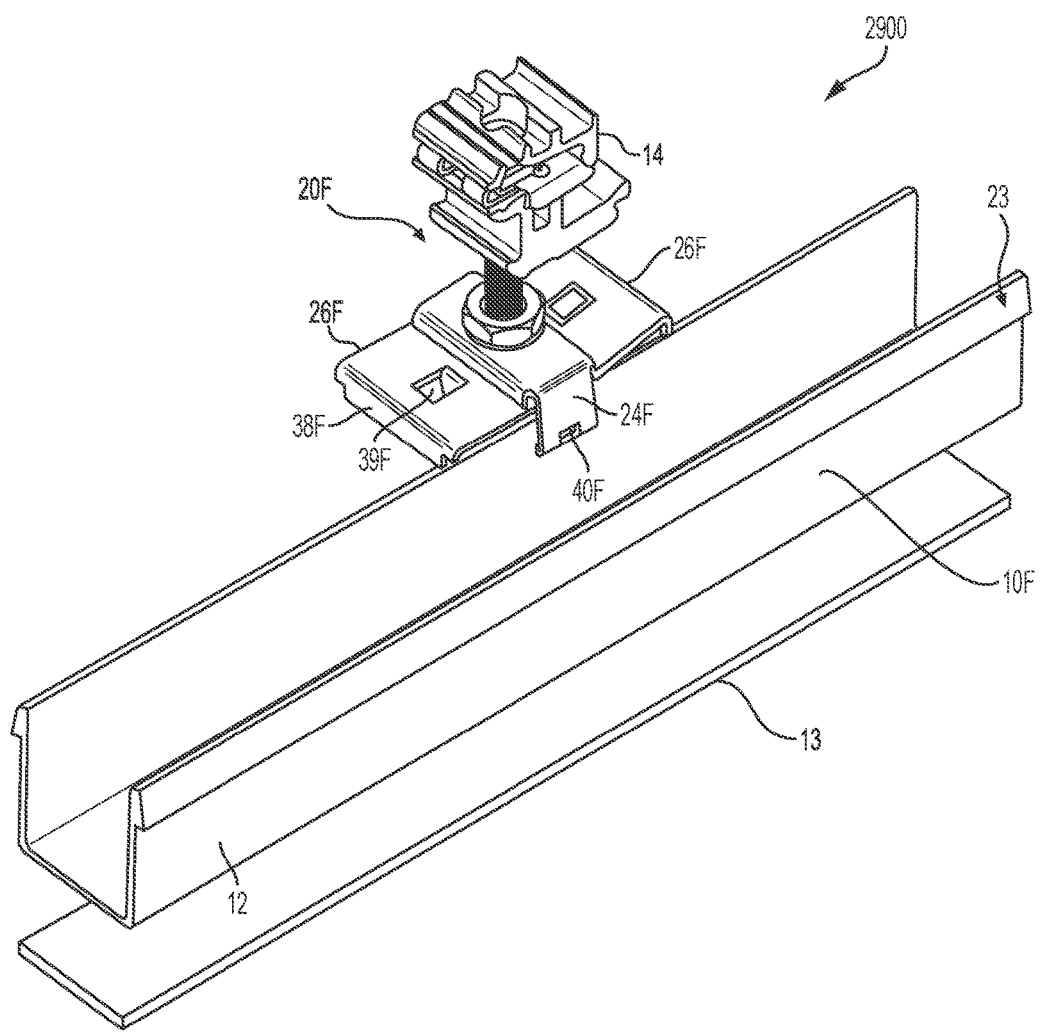
FIG. 30 shows an exploded perspective view of the mounting system shown in FIG. 29.

Mounting system 2500 may also include coupling assembly 20E, which may operate similar to coupling assemblies 20A-20D described above. For example, as seen in FIG. 23, coupling assembly 20E may include main body 22E having a pair of arms 24E extending outwardly therefrom. As with arms 24A-24D of coupling assemblies 20A-20D, arms 24E may be dimensioned to be wrapped around outer surfaces of elongated walls 12 of extruded base member 10E and may include projections 37E that project inwards so as to allow arms 24E to latch around outer ridges 23. Coupling assembly 20E may include compressible insert 29E positioned underneath main body 22E that may act as a spring member. Compressible insert 29E may be made from a separate material as main body 22E, and preferably, may be made from a compressible material. For example, compressible insert 29E may be made of a synthetic rubber such as ethylene propylene diene monomer rubber (EPDM). It will be understood, however, that compressible insert 29E may be made of any suitable compressible material. Compressible insert 29E may be affixed to the bottom portion of main body 22E using any suitable adhesive technique. As can be seen in FIG. 28, compressible insert 29E may be compressed when coupling assembly 20E is snapped onto extruded base member 10E, and may provide friction between the top of elongated walls 12 and the bottom of main body 22E of coupling assembly 20E, thus preventing sliding of the coupling along the top of extruded base member 10E once in a locked position.

Referring next to FIGS. 29-34, mounting system 2900 is shown, in accordance with an embodiment. As can be seen in FIGS. 29-34, mounting system 2900 may be similar to mounting systems 300, 900, 1700, 2100, and 2500 described above. For example, mounting system 2900 may include extruded base member 10F and connector 14, which may include some or all of the features described above with respect to like-numbered components of mounting systems 300, 900, 1700, 2100 and 2500 described above. In the example depicted in FIGS. 29-34, extruded base member 10F of mounting system 2900 may be similar to extruded base member 10E of mounting system 2500, with center base 11, and a pair of upwardly extending elongated walls 12 with ridges 23 disposed near the top of elongated walls 12.

Figure 31:
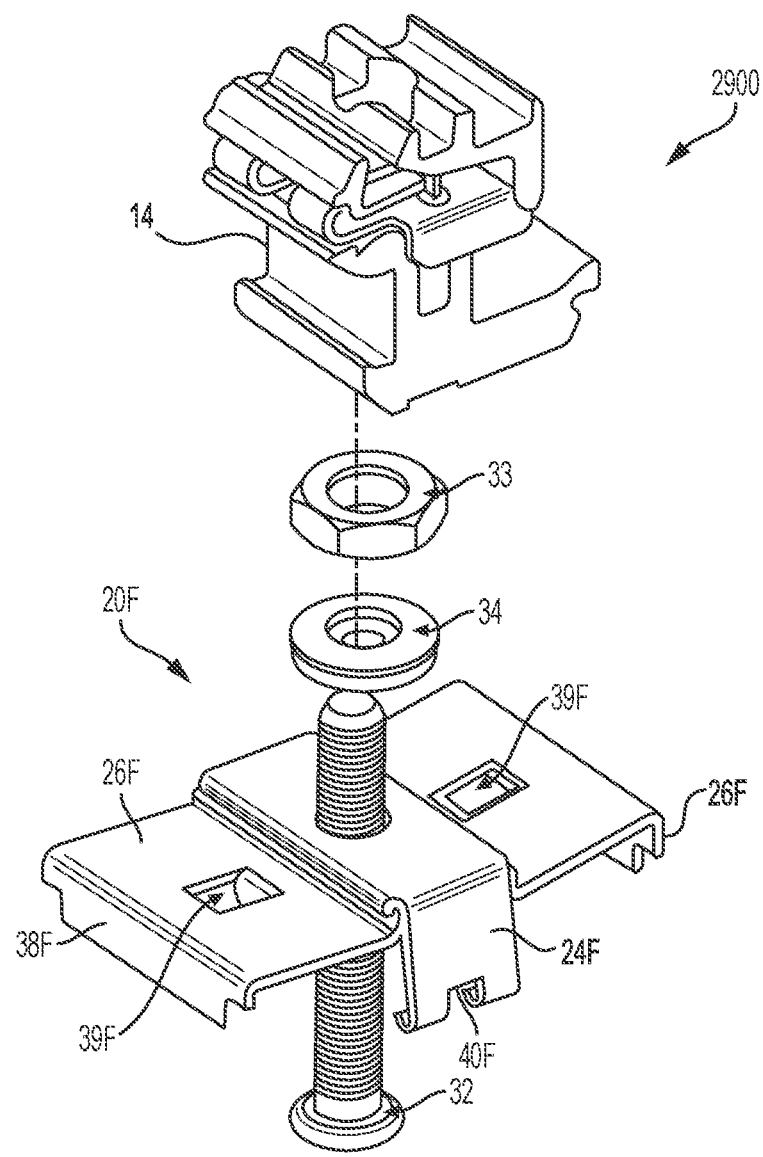
FIG. 31 shows an exploded perspective view of a coupling used in the system of FIG. 29, in accordance with an embodiment.

Mounting system 2900 may also include coupling assembly 20F, which may operate similar to coupling assemblies 20A-20E described above. As best seen in FIG. 31, coupling assembly 20F may include a first set of arms 24F and a second set of arms 26F, both extending from main body portion 22F of coupling assembly 20F. Arms 24F may operate similarly to arms 24A-E, and may be dimensioned to be wrapped around outer surfaces of elongated walls 12 of extruded base member 10F and may include projections 37F that project inwards so as to allow arms 24F to latch around outer ridges 23. Arms 26F may include a stepped edge 38F and windows 39F. In some embodiments, arms 24F may also include windows 40F.

Operation of mounting assembly 2900 in pre-installation and installed positions will be described with reference to FIGS. 32A and 32B. FIG. 32A shows coupling assembly 20F in a pre-installation position on extruded base member 10F, in accordance with an embodiment. Specifically, in this position, coupling assembly 20F is rotated so that it is balanced on elongated walls 12 of extruded base member, with arms 26F resting on elongated walls 12, and arms 24F sitting in between elongated walls 12. It will be understood that arms 26F of coupling assembly 20F may be dimensioned to extend outside of elongated walls 12 in this position so as to balance coupling assembly 20F thereon, and arms 24F may be dimensioned to remain in between elongated walls 12 without engaging either side 12. In some embodiments, windows 39F may allow an installer to view top surfaces of elongated walls 12 and ensure elongated walls 12 are centered within window 39F for appropriately balancing coupling 26F on extruded base member 10F. In this pre-installation position, coupling assembly 20F may slide along extruded base member 10F until the desired position is located.

Figure 32B:
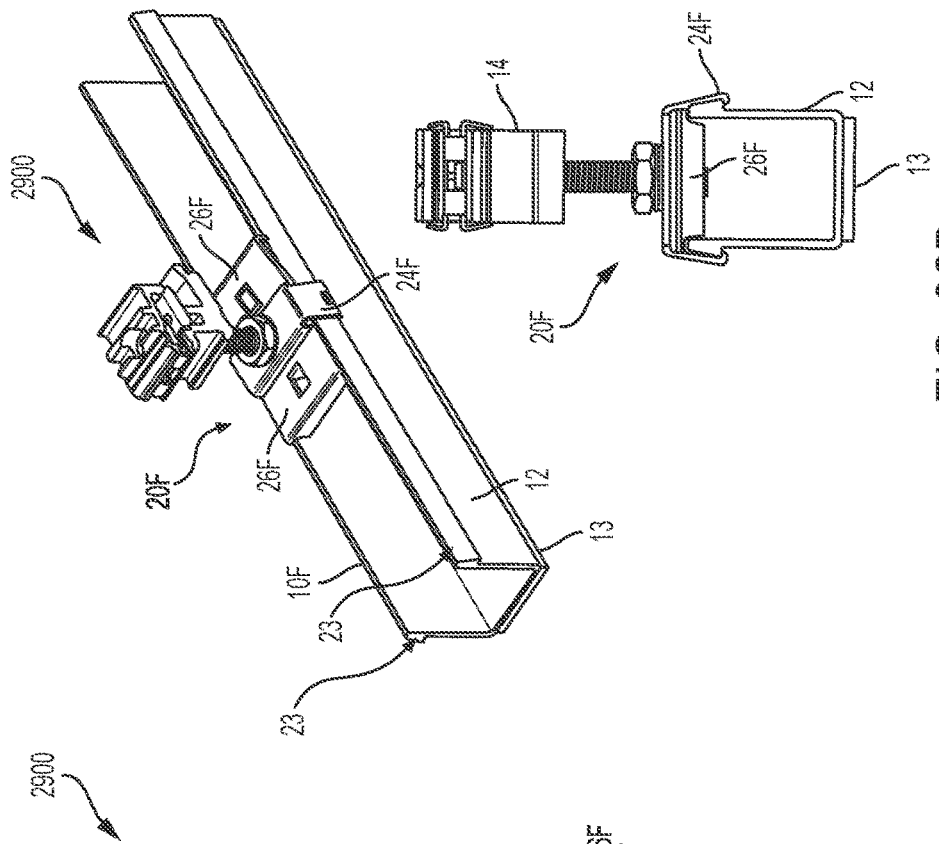
FIG. 32B shows views of the mounting system shown in FIG. 29 in an installed position, in accordance with an embodiment.
Figure 32A:
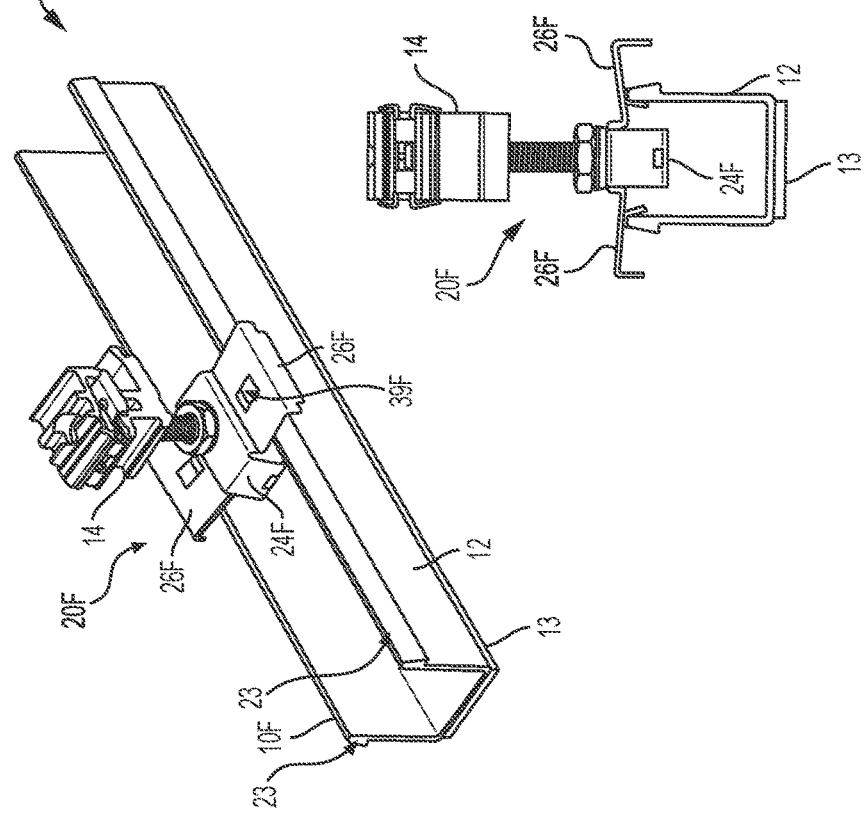
FIG. 32A shows views of the mounting system shown in FIG. 29 in a pre-installation position, in accordance with an embodiment.
Figure 34:
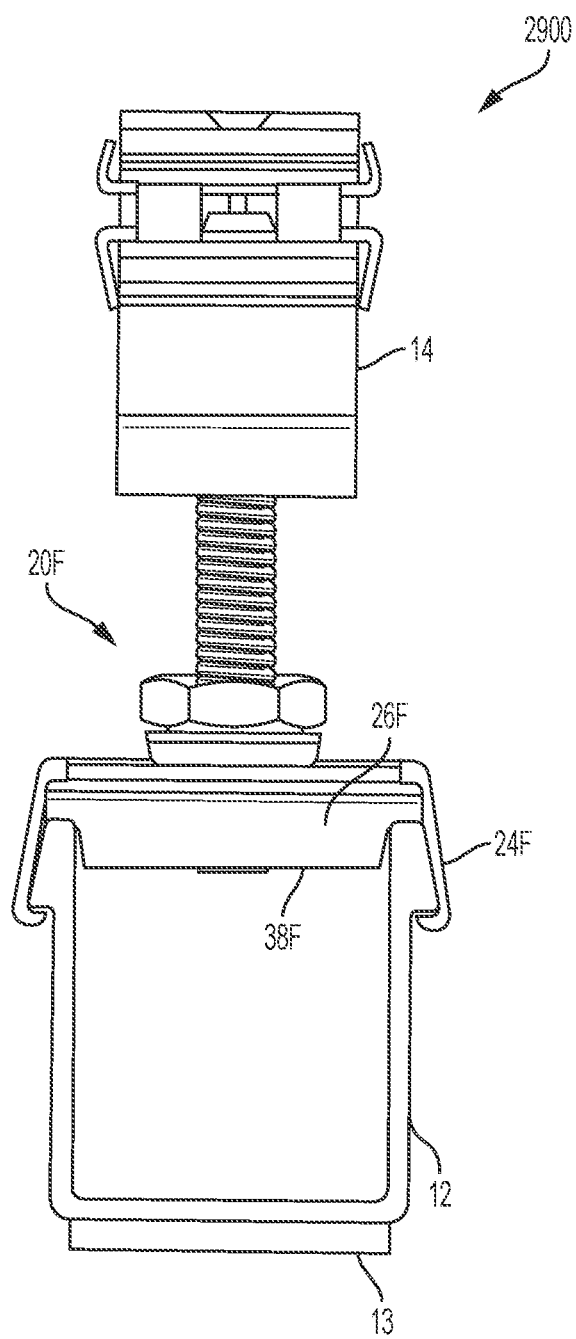
FIG. 34 shows an end elevation view of the mounting system shown in FIG. 29.

Once the desired position is located, coupling assembly 20F may be rotated 90 degrees and pressed down into an installed position as depicted in FIG. 32B. As can be seen in FIG. 32B, in the installed position, arms 24F may wrap around ridges 23 and stepped edges 38F of arms 26F may engage with elongated walls 12 so as to snap coupling assembly 20F into a locked position. It will be understood that arms 26F may create a preload necessary to take up tolerances between elongated walls 12. As can be seen in FIG. 34, in some embodiments, the outer portions of stepped edge 38F may penetrate into elongated walls 12 so as to keep coupling assembly 20F from sliding once snapped into a locked position. It will be understood that this penetration may also provide grounding between components.

Figure 33:
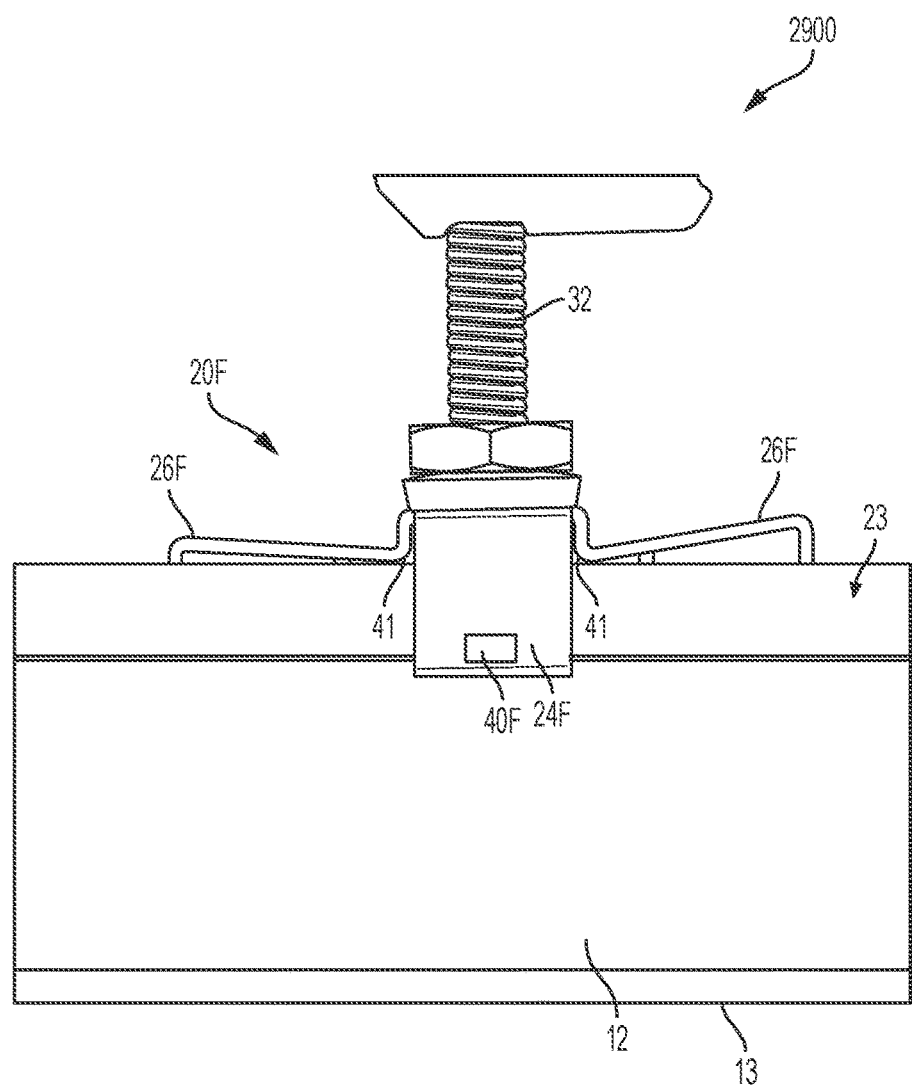
FIG. 33 shows a side elevation view of the mounting system shown in FIG. 29.

With reference to FIG. 33, it can be seen that in some embodiments, where a high down-force is applied to coupling assembly 20F (for example, as a result of snow or wind), portions of arms 26F may make contact with extrusion 12, for example, at locations 41. This may aid in distributing such down forces as one with skill in the art would understand. As can also be seen in FIG. 33, in some embodiments, windows 40F may allow a user to detach coupling assembly 20F from extruded base 10F. For example, coupling assembly 20F may be detached from extruded base member 10F by inserting the end of a screwdriver (or other tool sized to fit therein) into window 40F and prying arms 24F off of outer ridges 23.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments will be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic (PV) mounting system, the system comprising:
    a base member mountable to a supporting surface of a roof, the base member comprising first and second elongated walls having interior surfaces at least partially defining an interior channel, the first and second elongated walls comprising elongated retaining features outside of the interior channel;
    a slidable coupling mounted onto the base member, the slidable coupling being slidable along and restrainable by the retaining features of the base member;
    a locking mechanism comprising a spring member that engages surfaces of the slidable coupling and the base member to secure the slidable coupling to the base member at a fixed location along the length of the base member; and
    a module connector mounted to the slidable coupling, wherein the module connector comprises features to couple to two PV modules
    wherein the slidable coupling comprises a center body portion, and a pair of arms extending from opposite sides of the center body portion,
    wherein the arms are dimensioned to be received around the outer surfaces of the elongated walls of the base member,
    wherein the elongated retaining features comprise a pair of ridges on the outer surfaces of the elongated walls of the extruded base member, and
    wherein the locking mechanism further comprises a pair of inward projections extending from the pair of arms of the slidable coupling and a pair of tabs extending outward from the center body portion of the slidable coupling.

2. The system of claim 1, wherein the elongated walls of the base member are received between the pair of arms and the pair of tabs of the slidable coupling.

3. The system of claim 1, wherein the arms and the inward projections are dimensioned to latch around the ridges, and the tabs are dimensioned to be received against the interior surfaces of the elongated walls of the base member so as to provide a snap-fit connection between the slidable coupling and the base member.

4. The system of claim 1, wherein the pair of arms comprises a first pair of arms, wherein the slidable coupling comprises a second pair of arms extending from the center body portion, the second pair of arms dimensioned to be received in between interior surfaces of the elongated walls of the base member, wherein an edge of each of the second pair of arms is configured to penetrate a surface of the base member when the slidable coupling is secured to the base member.

5. The system of claim 1, wherein the length of the base member is less than lengths of each side of the PV modules.

6. The system of claim 1, further comprising a release mechanism to release the slidable coupling from the base member.

7. The system of claim 1, wherein the base member is an extruded base member.

8. The system of claim 1, wherein the spring member is coupled to the slidable coupling and configured to take up tolerances between the slidable coupling and the base member when the slidable coupling is secured to the base member.

9. The system of claim 8, wherein the spring member comprises a clip.

10. The system of claim 8, wherein the spring member comprises a compressible material affixed to a bottom surface of the slidable coupling.

11. The system of claim 8, wherein each of the elongated walls of the base member comprises an upper raised edge extending therealong, wherein the spring member is configured to take up tolerances between the raised edges and the slidable coupling.

12. A coupling assembly for mounting photovoltaic (PV) modules, the assembly comprising:
    a center body portion with holes for receiving a connection to a pivot mount connector, wherein the pivot mount connector comprises features to couple to two adjacent PV modules;
    a pair of arms extending from opposite sides of the center body portion, wherein the arms are dimensioned to be received around first and second elongated walls of a base member mountable to a supporting surface of a roof, wherein the first and second elongated walls have interior surfaces at least partially defining an interior channel, the first and second elongated walls comprising elongated retaining features outside of the interior channel, wherein the coupling assembly is slidably positionable along a length of the base member; and
    a locking mechanism comprising a spring member that engages surfaces of the slidable coupling and the base member to secure the coupling assembly to the base member at a fixed location along the length of the base member, and
    an inward projecting tab extending from an end of each of the pair of arms, wherein the inward projecting tabs are dimensioned to latch each of the pair of arms around the elongated retaining features of the elongated walls of the base member.

13. The coupling assembly of claim 12, wherein the spring member comprises a pair of clips wrapping around a top surface of the center body portion, wherein opposite ends of each clip push down against a top surface of each of the elongated walls of the base member when the coupling assembly is secured to the base member.

14. The coupling assembly of claim 12, wherein the spring member comprises a pair of clips extending through apertures in the center body portion, wherein opposite ends of each clip push down against a top surface of each of the elongated walls of the base member when the coupling assembly is secured to the base member.

15. The coupling assembly of claim 12, wherein the spring member comprises a pair of clips wrapping around a bottom surface of the center body portion, wherein each of the pair of clips comprise bottom indents extending from the bottom surface of clips, wherein the bottom indents push down against a top surface of the elongated walls of the base member when the coupling assembly is secured to the base member.

16. The coupling assembly of claim 12, wherein the spring member comprises a compressible material affixed to a bottom surface of the center body portion, wherein the compressible material provides friction between the bottom surface of the center body portion and top surfaces of the elongated walls of the base member when the coupling assembly is secured to the base member.

17. A photovoltaic (PV) mounting system, the system comprising:

an extruded base member mountable to a supporting surface of a roof, the extruded base member comprising first and second elongated walls having interior surfaces at least partially defining an interior channel, the first and second elongated walls comprising elongated retaining features on exterior surfaces of the first and second elongated walls outside of the interior channel;

a coupling mounted onto the extruded base member, the coupling comprising a center body portion and a pair of arms extending from the center body portion dimensioned to be received around the exterior outer surfaces of the first and second elongated walls and comprising a pair of inward projections extending from the pair of arms and a pair of tabs extending outward from the center body portion wherein the coupling is slidably positionable along a length of the extruded base member;

a locking mechanism comprising a spring member that engages surfaces of the slidable coupling and the extruded base member to secure the coupling to the extruded base member at a fixed location along the length of the extruded base member; and a pivot mount connector mounted to the coupling, wherein the pivot mount connector comprises:
 a body portion;
 a key portion extending from a first side of the body portion, the key portion adapted to receive a first PV module pivot locked thereon; and
 a tongue portion extending from a second side of the body portion, the tongue portion adapted to receive a second PV module slid thereon.

* * * * *